United States Patent [19]

Dvorkis et al.

[11] Patent Number: 5,367,151
[45] Date of Patent: Nov. 22, 1994

[54] SLIM SCAN MODULE WITH INTERCHANGEABLE SCAN ELEMENT

[75] Inventors: Paul Dvorkis, Stony Brook; Howard Shepard, Great River, both of N.Y.

[73] Assignee: Symbol Technologies, Inc., Bohemia, N.Y.

[21] Appl. No.: 952,414

[22] Filed: Sep. 29, 1992

Related U.S. Application Data

[63] Continuation-in-part of Ser. No. 943,232, Sep. 10, 1992, and Ser. No. 789,705, Nov. 8, 1991, which is a continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.$^5$ .............................................. G06K 7/10
[52] U.S. Cl. .................................. 235/472; 235/462; 359/213; 359/224
[58] Field of Search ................ 235/462, 467, 470, 472; 359/212, 213, 214, 224, 226, 230, 290, 291

[56] References Cited

U.S. PATENT DOCUMENTS

| | | | |
|---|---|---|---|
| 1,202,446 | 10/1916 | Speed | 310/38 |
| 1,552,186 | 9/1925 | Anderson | 73/653 |
| 1,800,601 | 4/1931 | Centeno | 358/208 |
| 1,873,926 | 8/1932 | Centeno | 358/208 |
| 2,971,054 | 2/1961 | Holt, Jr. | 358/87 |
| 2,989,643 | 6/1961 | Scanlon | 250/230 |
| 3,087,373 | 4/1963 | Poor et al. | 250/230 |
| 3,532,408 | 10/1970 | Dostal | 359/199 |
| 3,642,343 | 2/1972 | Tchejeyan et al. | 359/210 |
| 3,981,556 | 9/1976 | Sabatelli et al. | 439/874 |
| 3,981,566 | 9/1976 | Frank et al. | 359/224 |
| 3,998,092 | 12/1976 | Maccabee | 359/214 |
| 4,021,096 | 5/1977 | Dragt | 359/223 |
| 4,175,832 | 11/1979 | Umeki et al. | 359/225 |
| 4,199,219 | 4/1980 | Suzuki et al. | 359/209 |
| 4,251,798 | 2/1981 | Swartz et al. | 235/462 |
| 4,256,364 | 3/1981 | Minoura et al. | 359/220 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |

(List continued on next page.)

FOREIGN PATENT DOCUMENTS

471291A2 7/1991 European Pat. Off. .
2175705 12/1986 United Kingdom .

OTHER PUBLICATIONS

Reich, "The Use of Electro-Mechanical Mirror Scanning Devices", SPIE, vol. 85, Laser Scanning Components & Techniques, pp. 47-55 no month (1976).
IBM Technical Disclosure Bulletin, W. L. Grabowski and R. J. Wohl, vol. 8, No. 5, Oct. 1962, p. 78.

*Primary Examiner*—Donald Hajec
*Assistant Examiner*—Michael G. Lee

[57] ABSTRACT

An optical scanning module has a metal base, a first circuit board mounted across one end of the metal base and a second circuit board mounted orthogonal to the first circuit board. The metal base supports a light emitter for producing a scanning beam and serves as a heat sink for the emitter. A flexible support attached to the metal base supports a mirror for oscillating motion. The module includes a drive mechanism, typically in the form of a permanent magnet and electromagnet, for producing reciprocal motion of the mirror. A detector included in the module senses light reflected from an indicia scanned by the beam. A flexible electrical cable connects the circuitry on the first and second circuit boards so that circuitry operates together to produce all signals necessary for operation of the scanner module and to process the electrical signals from the detector. Preferred embodiments include a flexible support consisting of a planar spring located between the mirror and one of the magnets. The components of the module are dimensioned so that the weight of the magnet balances that of the mirror. The invention also encompasses systems for scanning the beam simultaneously in two orthogonal directions at two different frequencies. This bi-directional scanning can produce a raster scan pattern for reading two-dimensional bar codes, or this scanning can produce a moving zig-zag pattern for reading truncated bar codes.

44 Claims, 14 Drawing Sheets

U.S. PATENT DOCUMENTS

| | | | |
|---|---|---|---|
| 4,496,831 | 1/1985 | Swartz et al. | 235/472 |
| 4,593,186 | 6/1986 | Swartz et al. | 235/472 |
| 4,682,501 | 12/1986 | Glynn | 359/199 |
| 4,705,365 | 11/1987 | Wakita et al. | 359/224 |
| 4,732,440 | 3/1988 | Gadhok | 359/214 |
| 4,760,248 | 7/1988 | Swartz et al. | 235/472 |
| 4,808,804 | 2/1989 | Krichever et al. | 235/462 |
| 4,816,660 | 3/1989 | Swartz et al. | 235/472 |
| 4,816,661 | 3/1989 | Kirchever et al. | 235/472 |
| 4,871,904 | 10/1989 | Metlitsky et al. | 235/467 |
| 4,877,949 | 10/1989 | Danielson et al. | 235/462 |
| 4,902,083 | 2/1990 | Wells | 359/214 |
| 4,919,500 | 4/1990 | Paulsen | 359/214 |
| 4,923,281 | 5/1990 | Krichever et al. | 350/245 |
| 4,930,848 | 6/1990 | Knowles | 235/467 X |
| 4,962,980 | 10/1990 | Knowles | 350/6.6 |
| 4,974,918 | 12/1990 | Delache et al. | 359/225 |
| 5,068,865 | 11/1991 | Ohshima et al. | 372/36 |
| 5,099,110 | 3/1992 | Shepard et al. | 235/472 |
| 5,099,110 | 3/1992 | Sheperd et al. | 235/470 X |
| 5,140,144 | 8/1992 | Sheperd et al. | 235/462 X |
| 5,168,149 | 12/1992 | Dvorkis et al. | 235/472 |
| 5,168,149 | 12/1992 | Dvorkis et al. | 235/467 X |
| 5,198,651 | 3/1993 | Barkan et al. | 235/467 X |

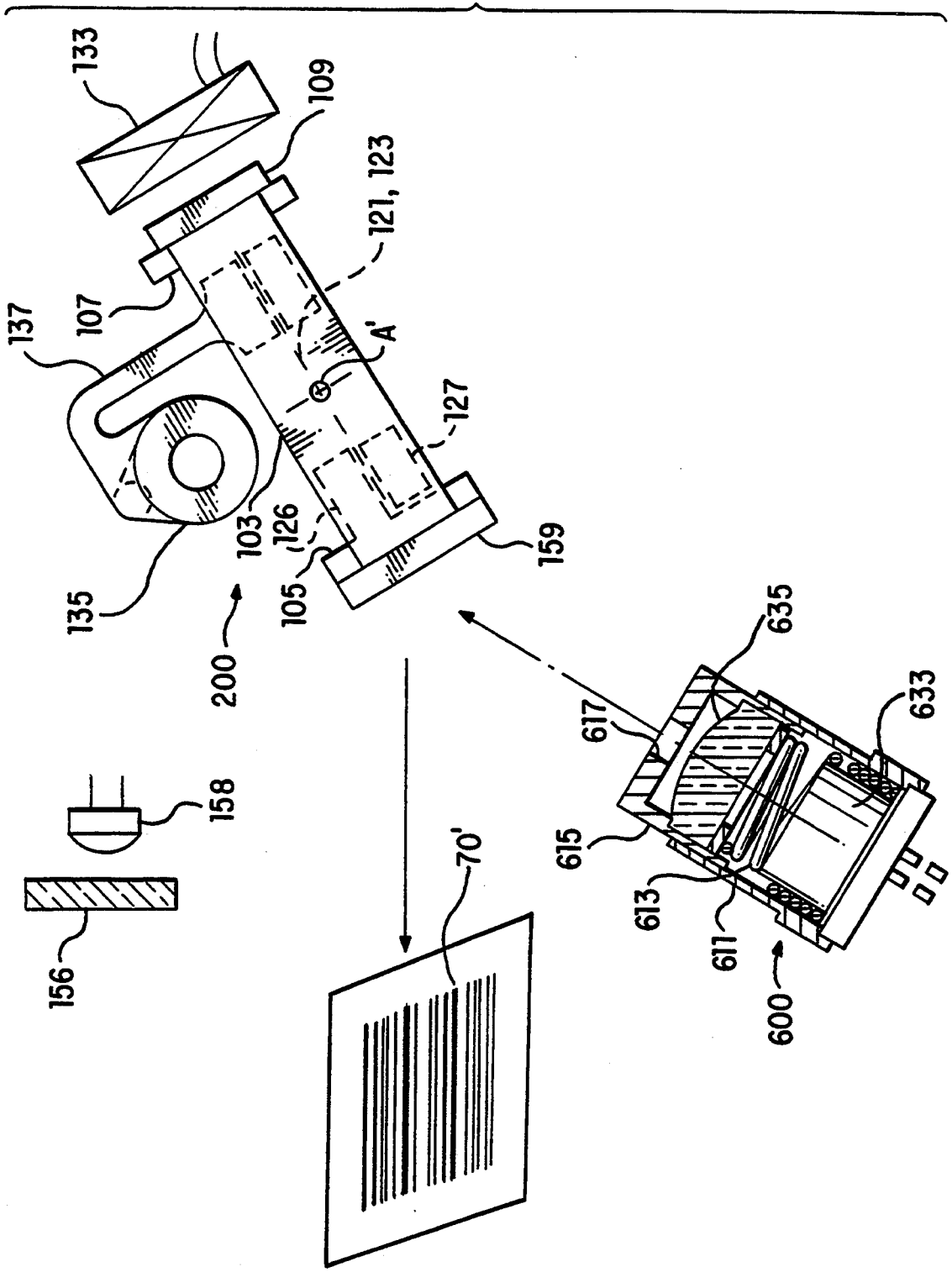

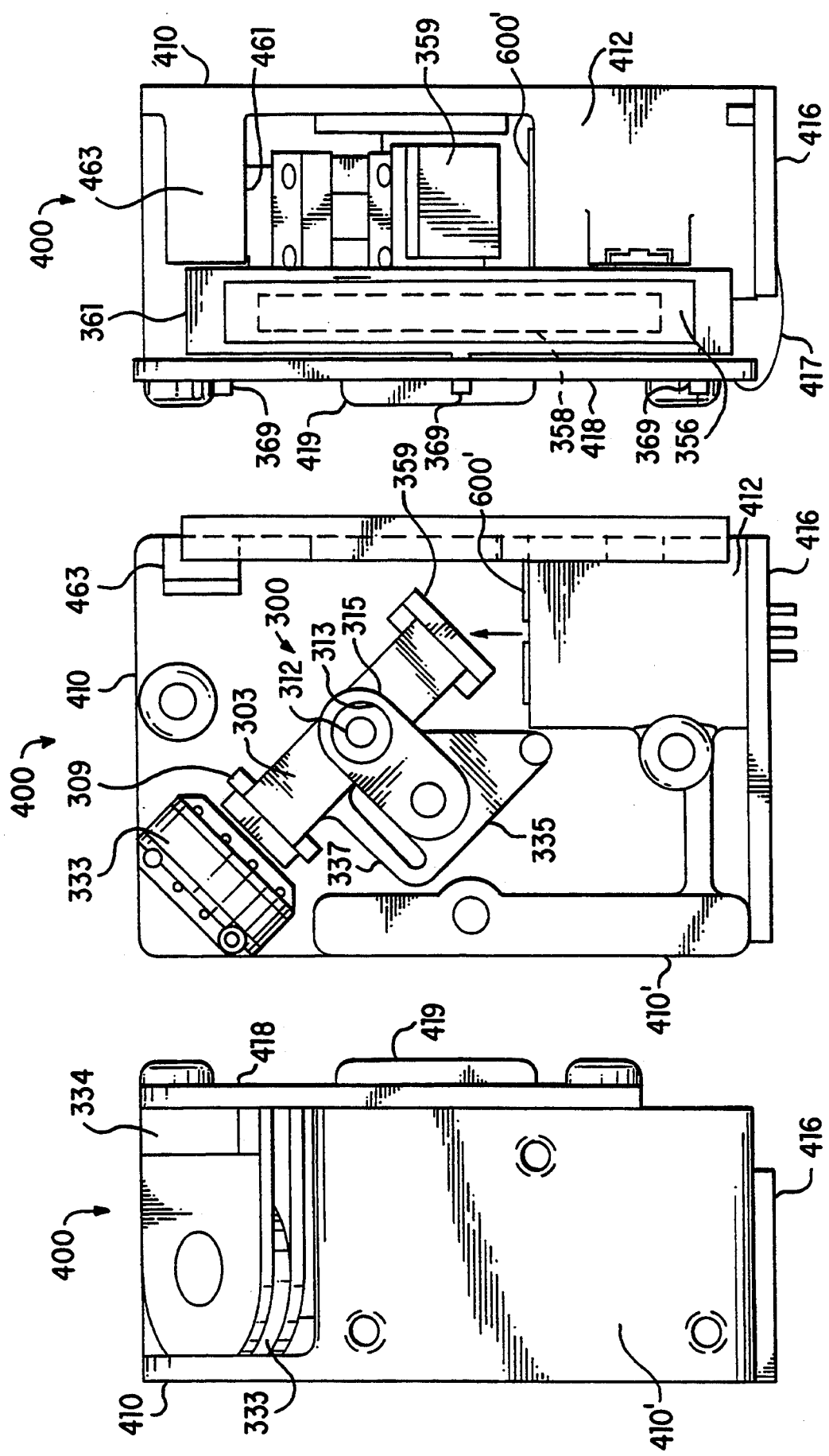

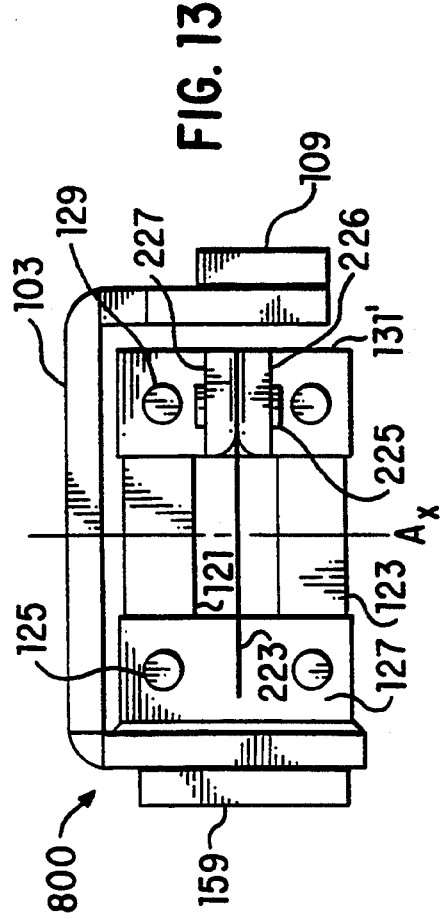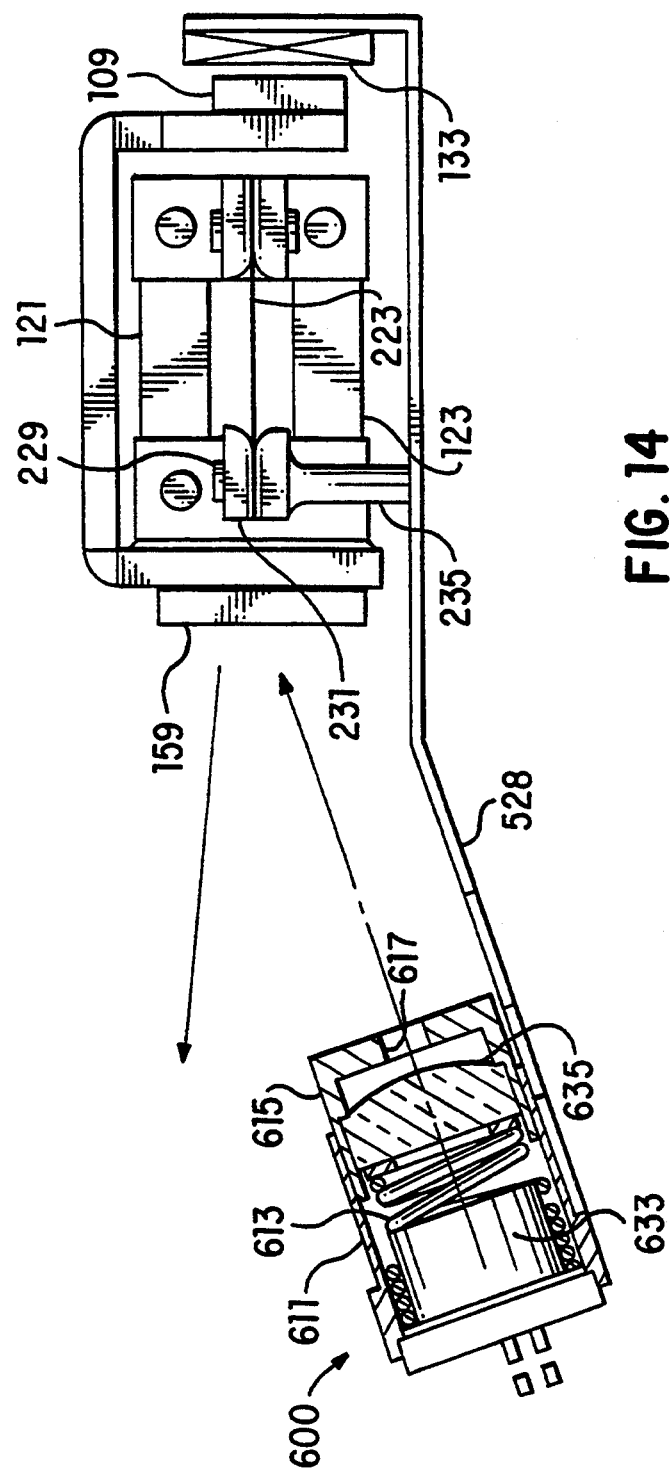

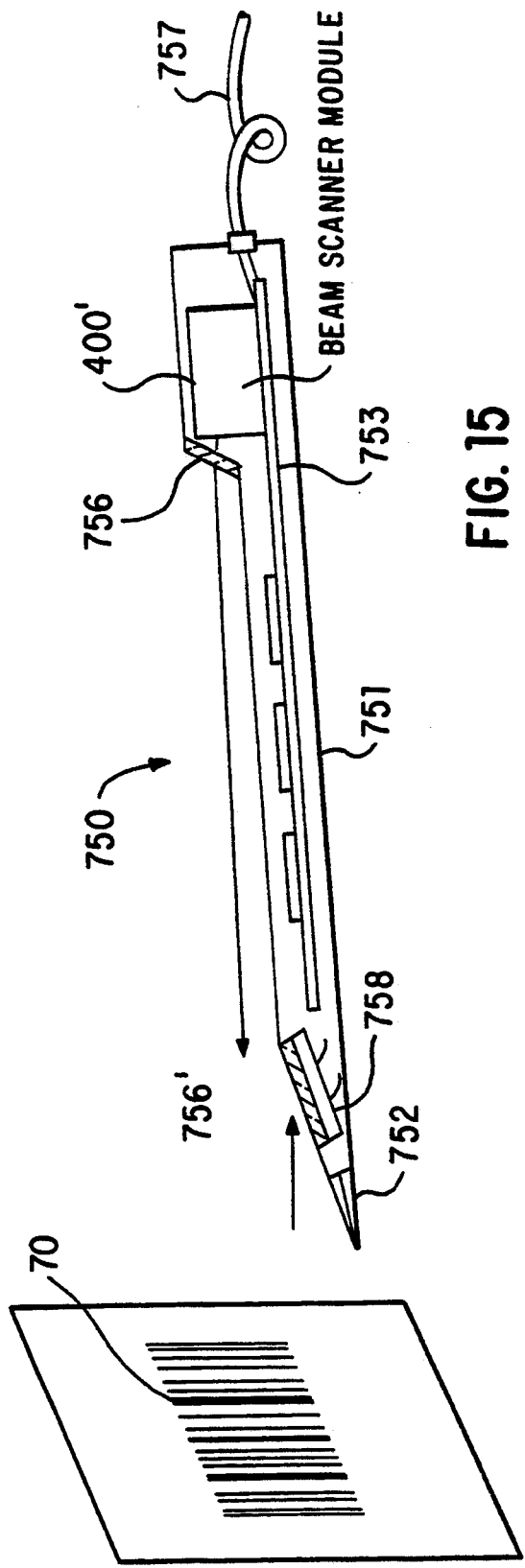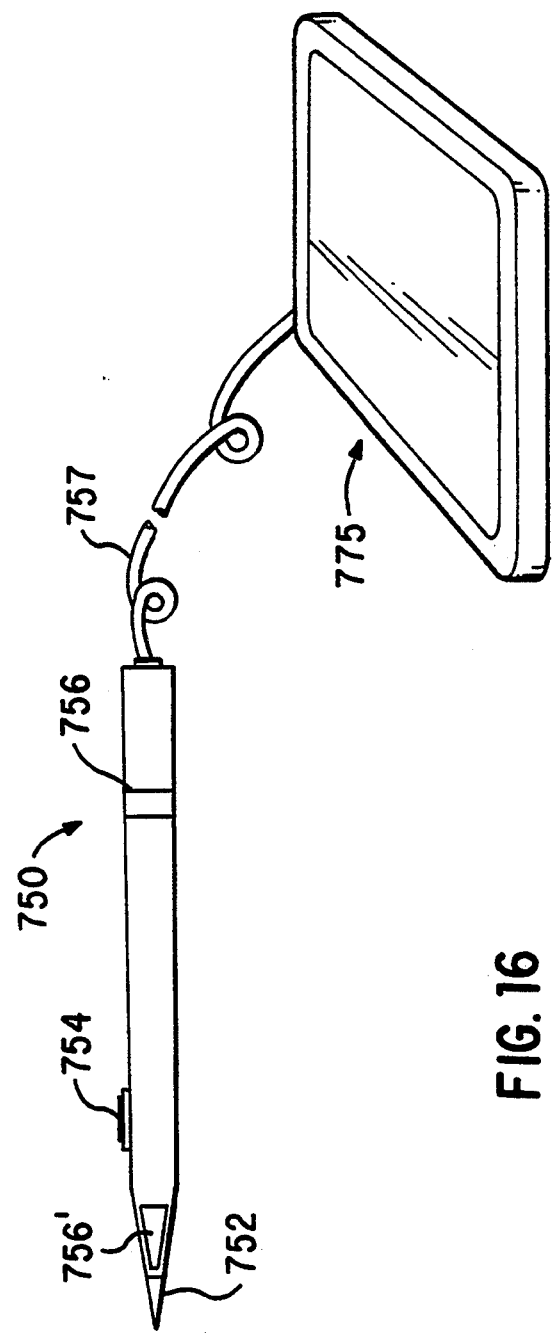
FIG. 15
FIG. 16

SLIM SCAN MODULE WITH INTERCHANGEABLE SCAN ELEMENT

CROSS-REFERENCE TO RELATED APPLICATIONS

This application is a continuation-in-part of copending application Ser. No. 789,705 filed on Nov. 8, 1991, which is a continuation-in-part of application Ser. No. 520,464 filed on May 8, 1990, which issued as U.S. Pat. No. 5,168,149 which is a continuation-in-part of application Ser. No. 428,770 filed on Oct. 30, 1989, which issued as U.S. Pat. No. 5,099,110. Each of the above identified applications is incorporated herein by reference. This application is also a continuation-in-part of copending application Ser. No. 943,232 filed on Sep. 10, 1992.

TECHNICAL FIELD

This invention relates to optical scanning devices, such as bar code scanners, and more particularly to improved laser scanning modules for use in applications requiring particularly small scanners. The invention also relates to scanners adapted for reading truncated bar codes, e.g., codes having portions which are unreadable due to damage or printing defects.

BACKGROUND

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information.

A bar code reader illuminates the code and senses light reflected from the code to detect the widths and spacings of the code symbols and derive the encoded data. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy ant convenient to operate.

A variety of scanning devices are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, e.g., bar code symbols, particularly of the Universal Product Code (UPC) type, at a certain working range or reading distance from a hand-held or stationary scanner.

FIG. 1 illustrates an example of a prior art bar code reader unit 10 implemented as a gun shaped device, having a pistol-grip type of handle 53. A lightweight plastic housing 55 contains the laser light source 46, the detector 58, the optics and signal processing circuitry and the CPU 40, as well as a power source or battery 62. A light-transmissive window 56 in the front end of the housing 55 allows the outgoing light beam 51 to exit and the incoming reflected light 52 to enter. The user aims the reader 10 at a bar code symbol 70 from a position in which the reader 10 is spaced from the symbol, i.e., not touching the symbol or moving across the symbol.

As further depicted in FIG. 1, the reader 10 may include a suitable lens 57 (or multiple lens system) to focus the scanned beam into a scanning spot at an appropriate reference plane. A light source 46, such as a semiconductor laser diode, introduces a light beam into the axis of the lens 57, and the beam passes through a partially-silvered mirror 47 and other lenses or beam-shaping structures as needed. The beam is reflected from an oscillating mirror 59 which is coupled to a scanning motor 60 energized when the trigger 54 is pulled. The oscillation of the mirror 59 causes the reflected beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 52 reflected back by the symbol 70 passes back through the window 56 for application to the detector 58. In the exemplary reader 10 shown in FIG. 1, the reflected light reflects off of mirror 59 and partially-silvered mirror 47 and impacts on the light sensitive detector 58. The detector 58 produces an analog signal proportional to the intensity of the reflected light 52.

A digitizer circuit mounted on board 61 processes the analog signal from detector 58 to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder, typically a programmed microprocessor 40 which will have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

To scan a symbol 70, a user aims the bar code reader unit 10 and operates movable trigger switch 54 to activate the light beam 51, the scanning motor 60 and the detector circuitry. If the scanning beam is visible, the operator can see the scan pattern on the surface on which the symbol appears and adjust aiming of the reader 10 accordingly. If the light produced by the source 46 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The reader 10 may also function as a portable computer terminal. If so, the bar code reader 10 would include a keyboard 48 and a display 49, such as described in the previously noted U.S. Pat. No. 4,409,470.

In optical scanners of the type discussed above, the laser diode, the lens, the mirror and the means to oscillate the mirror all add size and weight to the handheld scanner. The photodetector and the associated processing circuitry also add size and weight. In applications involving protracted use, a large heavy handheld unit can produce fatigue. When use of the scanner produces fatigue or is in some other way inconvenient, the user is reluctant to operate the scanner. Any reluctance to consistently use the scanner defeats the data gathering purposes for which bar code systems are intended. Also, a need exists for small scanner units to fit into small compact devices, such as notebooks.

Thus, an ongoing objective of bar code reader development is to miniaturize the bar code reader as much as possible, and a need still exists to further reduce the size and weight of the scan unit and to provide a particularly convenient scanner system. The mass of the moving components should be as low as possible to minimize the power required to produce the scanning movement and to facilitate operation at high scanning speeds.

It is also desirable to modularize scanning components, so that a particular module can be used in a variety of different scanners. A need exists, however, to develop a particularly small, light weight module which contains all necessary scanner components.

Smaller size scanning components tend to operate at higher scanning frequencies. In typical bar code scanning applications, however, the scanning frequency of the moving spot should be relatively low, typically 20 Hz or less. If the frequency increases, the speed of the spot as it passes over the indicia increases. The signals produced by the detector also increase in frequency, and consequently the bandwidth of the processing circuitry for analyzing the detector signals must be increased. Also, operation at higher scanning frequencies generally produces detector signals which include higher levels of noise, making accurate decoding more difficult.

Another series of problems has arisen in scanning bar codes which are difficult to read. Many bar codes are printed using relatively low quality printing techniques because the cost of printing such codes is low. The resultant bar codes, however, often include a number of printing defects. Also, even though printed without defects, bar code labels often become worn or damaged over time so that substantial portions of such codes become unreadable. Existing moving spot scanners produce a single scan line which remains stationary over the portion of the code at which the operator aims the scanner. If the scanned portion of the bar code contains one or more defects, the scanner typically can not obtain a valid reading of the code. The defect may or may not be sufficiently evident so that an operator can recognize the defect and aim the scanner at a portion of the code which contains no defects. If the operator tries repeatedly to scan the code, by chance the operator may aim the scanner at a section of the code free of defects and obtain a valid read result. The need to repeatedly scan the code, at times for no apparent reason, tends to frustrate the operator and slows down data gathering operations requiring scanning of large numbers of codes. Although explained in terms of scanning defective or damaged codes, similar problems arise in scanning particularly small codes. Clearly, a need exists to develop a scanner which can extract valid information from small indicia and/or intact portions of bar codes or similar indicia having optical defects.

Disclosure of the Invention

Objectives

One objective is to develop an entirely self-contained scanning module, including all components necessary to generate the light beam, scan the beam in a pattern across an indicia, detect light reflected back by the indicia and process signals representative of the reflected light. In this regard, the module should be small, light weight and easy to incorporate into a variety of different types of optical scanning systems.

Another objective of this invention is to minimize the size and weight of the elements used to produce the scanning motion of the light beam.

Another related objective is to develop an optical scanning system which is smaller and lighter weight, when held by an operator, and which is easier to manipulate to scan encoded data.

A further objective of the invention is to develop an optical scanner specifically adapted to reading coded indicia which include defects. A more specific form of this objective is to develop a scanner and or a method of scanning which will automatically move the scan line in a direction substantially orthogonal to the scan line until the scanner obtains sufficient information from the defective indicia to derive a valid read result.

Summary

In a first aspect, the invention is a self-contained optical scanning module for reading optically encoded indicia having portions of differing light reflectivity. The module has a metal base and an emitter, such as a laser diode, fixedly mounted on the metal base. In preferred embodiments, the metal base encircles the laser diode and serves as a heat sink for the diode. An optical scanning component, such as a mirror, directs the beam of light from the emitter toward the optically encoded indicia. A support, attached to the base, mounts the optical component in such a manner as to permit oscillating movement thereof. A drive mechanism produces a reciprocal motion of the optical component on the support such that the beam of light scans across a surface on which the indicia appears. A photodetector receives light reflected back from the surface and produces electrical signals corresponding to the differing light reflectivity of the optically encoded indicia. The module includes first and second circuit boards mounted orthogonally with respect to each other. A flexible cable connects the circuitry on the two circuit boards together so that the circuitry produces the signals to drive the emitter and the signals to operate the drive mechanism and processes the electrical signals from the detector. Preferred embodiments of the module have circuitry for driving the emitter mounted on the first circuit board, and an application specific integrated circuit for producing the signals to operate the drive mechanism and for processing the electrical signals produced by the detector is mounted on the second circuit board.

Typically, the support for the optical scanning component includes a member, one end of which supports the component and the other end of which supports a magnet. The member and the magnet are dimensioned such that the weight of the magnet balances the weight of the optical scanning component with respect to an axis approximately half way between the mirror and the magnet. A flexible planar spring has a free end fixedly coupled to one of the ends of the member, and typically the other end of the spring connects to some fixed point. In a bi-directional scanning embodiment, the second end of the flexible planar spring would be supported by an additional flexible support structure. The flexible planar spring(s) are longer than the distance between one end of the member and the axis but shorter than the distance between the ends of the member. Typically, the flexible planar spring comprises a pair of flexible strips each consisting of a sheet formed of a flexible plastic material, such as Mylar TM or Kapton TM. This support structure can be quite small and still provide a low frequency vibration of the scanning component, as required for most bar code reading applications.

The invention also permits incorporation of a beam scanning module into a stylus or other type of writing implement. In this aspect, the invention includes a pen shaped housing having a tapered tip at one end, an enlarged section at an end opposite the tapered tip and an elongated body between the ends. A beam scanner module is located in the enlarged section of the pen shaped housing. This module emits a beam of light and directs the beam of light along a light path extending along an outer surface of the body of the pen shaped housing toward a target surface on which optically encoded indicia appears. The stylus also includes a writing instrument mounted in the tapered tip of the pen shaped housing. In the preferred embodiment, this writing instrument comprises electronic stylus element for providing positional data inputs to a digitizer tablet upon contact of a tip of the pen shaped housing to a surface of the digitizer tablet. A photodetector is mounted in the pen shaped housing adjacent to the tapered tip, for sensing light reflected from the optically encoded indicia and producing an electrical signal representative of variations of light reflectivity of the optically encoded indicia. A manually actuable switch permits the operator to activate beam scanner module to initiate reading of the optically encoded indicia. The switch is mounted on a side surface of the body of the pen out of said light path at a point near the tapered tip. Consequently, the operator can activate the switch using the thumb or fore finger without obstructing the light path.

In another aspect, the invention relates to a method and a system for producing a zig-zag scanning pattern which moves progressively over a bar code symbol. The zig-zag pattern will include horizontal lines and diagonal lines. Because the scanning frequencies are chosen such that the pattern moves, rather than repeating each frame defined by the vertical scanning interval, the lines move across the indicia until the system can obtain a valid reading of the code. This allows easy reading of small truncated symbols. This approach also eliminates difficulties in aiming a one line type scanner at a truncated portion of a code which is free of defects.

To achieve the desired zig-zag scan pattern, the scanning system includes a first reciprocal support for mounting an optical scanning component for oscillating movement in a first direction and a second reciprocal support for mounting the first support for oscillating movement in a second direction. A first drive produces reciprocal motion of the optical component mounted on the first reciprocal support at a first oscillating frequency. A second drive, operating independently of the first drive, produces reciprocal motion of the optical component and the first reciprocal support together as mounted on the second reciprocal support at a second oscillating frequency. The first frequency is slightly larger than but not an exact multiple of second frequency. Typically, the ratio of the first frequency with respect to the second frequency is greater than 1.5 and less than 2.0, and preferably that ratio is approximately 1.75:1.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 3 provides a diagram of the layout of an embodiment of the invention, similar to that of FIG. 2, but with scanning mirror supported for motion in a direction which will produce a vertical scan line.

FIGS. 4 to 7 show top, left side, right side and end views, respectively, of a first preferred embodiment of the scanning module of the present invention.

FIGS. 12 and 13 are top and side views respectively, of a subassembly, without the fixed support structure, for use in a two-dimensional scanner in accord with the present invention.

FIG. 14 depicts a beam scanning module incorporating a laser diode and focusing module and the subassembly illustrated in FIGS. 12 and 13.

FIG. 15 illustrates in cross section an electronic stylus incorporating one of the beam scanner modules of the present invention.

FIG. 16 is a top view of the electronic stylus and scanner of FIG. 15 and illustrates connection of the electronic stylus to a digitizer tablet.

BEST MODES FOR CARRYING OUT THE INVENTION

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning a light beam and detecting reflected or scattered light as a representation of variations in light reflectivity at various points of the pattern or information. A bar code symbol is one example of an "indicia" which the present invention can scan.

The preferred embodiments of the invention discussed below will use a mirror as the scanning component which moves to produce the desired scanning motion of the beam spot over the indicia, however, other optical components could be moved. For example, the flexible support structure could support a light emitter (e.g. a laser diode) or an objective focusing lens for reciprocal motion.

GENERAL DESCRIPTION

Figure 2:
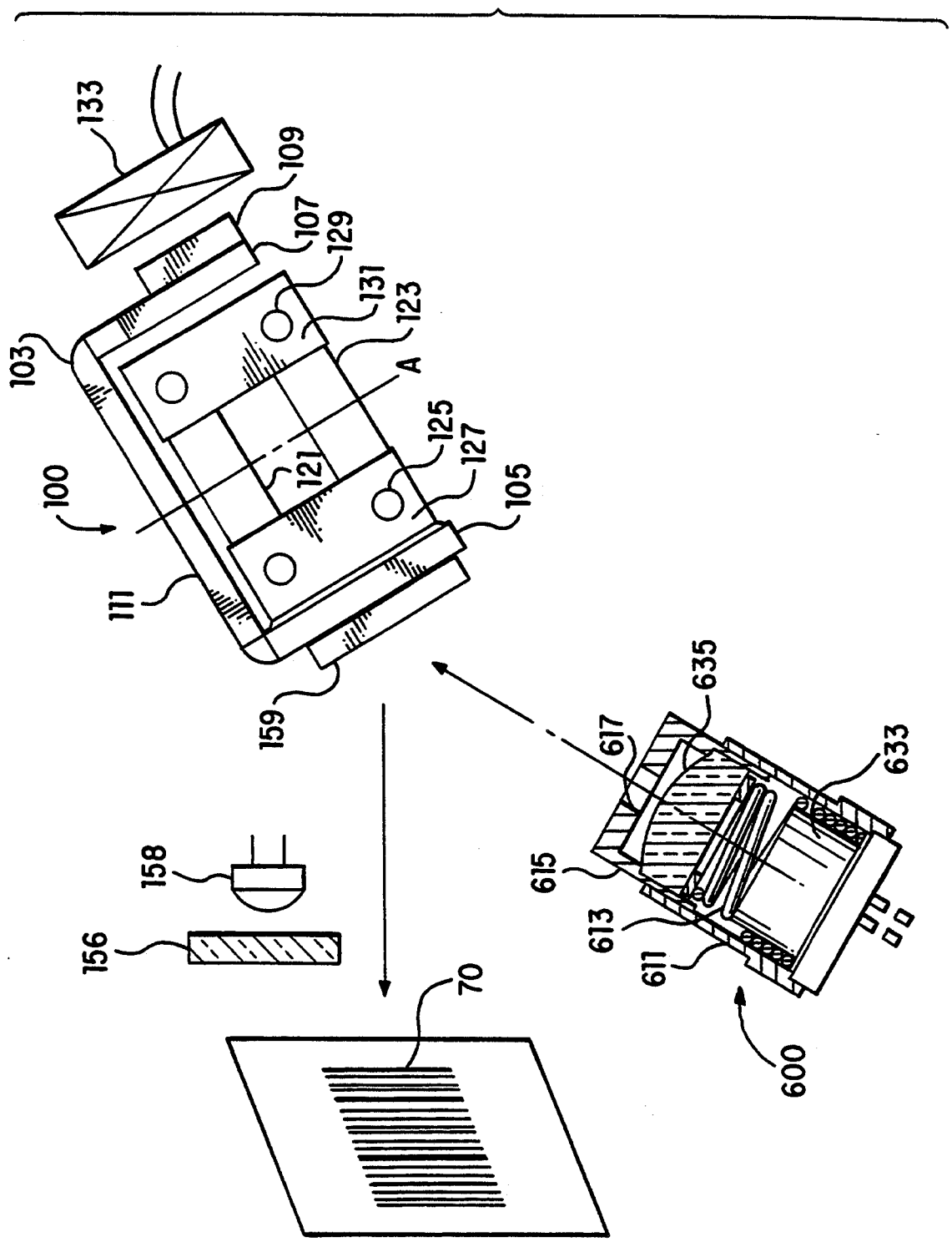
FIG. 2 provides a diagram of the layout of a first embodiment of the invention for producing a horizontal scan line.

FIGS. 2 and 3 show layouts of scanner systems including flexible support structures for providing reciprocal motion of a mirror, in accord with the present invention. The illustrated systems are essentially similar, and these drawings use the same reference numerals to identify corresponding components of each system. Comparison of the two drawings, however, highlights a key feature of the present invention. The basic flexible support structure supporting the scanning mirror can be oriented in any way desired to provide a desired orientation of the resulting scanning line. As explained in more detail below, the layout of FIG. 2 will produce a scan line to the left of the drawing substantially perpendicular to the plane of the drawing figure. In contrast, the system shown in FIG. 3 produces a scan line to the left of the drawing which lies substantially in the plane of the drawing figure.

As shown in FIG. 2, a laser diode and focusing module 600 produces a beam of light. Krichever et al., in their U.S. Pat. No. 4,923,281, disclose one example of a laser diode and optics module suitable for use as the module 600 in the present embodiment. Using the Krichever et al. implementation, the module 600 includes a visible laser diode (VLD) 633, such as a TOLD9201.138 manufactured by Toshiba. A lens 635 focuses the beam from the laser diode 633, as necessary, to prepare the beam for transmission to the mirror 502. The module has two telescoping holding members 611 and 615, and a biasing spring 613 positioned between the laser diode 633 and the lens 635. One holding member 611 is attached to the laser diode 633, and the other member 615 holds the lens 635. The second holder 615 also provides an aperture 617 for the light passing through the lens 635. Typically, the module 600 is assembled and focused properly for a particular application prior to incorporation of the module into the scanner system.

When current is applied to drive laser diode 633, the beam from the diode passes through the lens 635 and aperture 617 and impacts on a reflective surface of a mirror 159. The mirror 159 redirects the beam toward the target surface on which the coded indicia 70 appears. The mirror 159 also serves as a scanning component which moves so that the beam spot scans a line or pattern across the target surface.

A support structure 100 provides flexible support for the mirror 159 so as to permit the necessary reciprocal motion of the mirror. In the embodiment of FIG. 2, the mirror support structure 100 includes U-shaped member 103. The member 103 has a first arm 105, at one end, to which the mirror 159 is attached. A second arm 107 of the member 103 supports a first magnet, in this case a permanent magnet 109. A straight section 111 extends between and connects the first and second arms together to form the U-shape of member 103. Typically, the member 103 is formed of a rigid plastic material.

A pair of flexible strips 121, 123 form a planar spring connected to one of the arms of the U-shaped member 103. The drawings show a pair of strips, but the planar spring could comprise a single flexible strip or more than two flexible strips. In the preferred form, the flexible strip(s) each comprise Mylar ™ or Kapton ™ film, but other flexible elements could be used such as a flat strip of non-magnetic metal like a beryllium-copper alloy. When in the rest position, the strips 121, 123 remain in a relatively unflexed state and extend in a direction substantially parallel to the straight section 111 in the space between the first arm 103 and the second arm 107. The planar spring or flexible strip(s) are not as long as the straight section 103 or the distance between the mirror 159 and the magnet 109. In the system of FIG. 2, the free ends of the strips connect to the first arm 105, but the strips could easily connect to the second arm 107. The opposite ends of the strips 121, 123 are held by a fixed support structure.

More specifically, the free end of the Mylar ™ or Kapton ™ material sheets forming the flexible strips 121, 123 are fastened by suitable fasteners 125 (pins, rivets, screws, or the like) and thereby clamped between a plate 127 and a frame member extending from the rear surface of first arm 105 (located below the plate 127 and not substantially visible in FIG. 2). The opposite ends of the strips 121, 123 are fastened to a fixed support structure by suitable fasteners 129 and thereby clamped between a plate 131 and a support pedestal extending upward from a base (not shown) on which the system is mounted. The support pedestal is located below the plate 131 and is not visible in FIG. 2.

As shown, the member 103 extends from a point at which the free ends of the planar springs 121, 123 are attached to a point beyond where the opposite ends of the planar springs are fixedly attached to the support pedestal by fasteners 129 and plate 131. In the illustrated example, the mirror 159 is adjacent to the free ends of the planar spring 121, 123; and the member 103 supports the magnet 109 at a point beyond the fixed ends of the planar springs 121, 123. The components of the support structure 100, the mirror 159 and the magnet 109 are dimensioned such that the weight of the magnet balances the weight of the mirror with respect to an axis A approximately half way between the mirror and the magnet. The strips 121, 123 extend from the connection thereof to the arm 105 to the fixed point located between the axis A and the other arm 107. This means that the flexible strips 121, 123 are longer than the distance between the arm 105 and the axis A, or longer than half the distance between the mirror 105 and the magnet 109. As a result, the strips 121, 123 function as planar leaf spring elements and flex about the pivotal axis A. Vibration of the U-shaped member as supported on the springs 121, 123 produces reciprocal movement of the mirror 159 back and forth through an arc about the axis A. The arc is perpendicular to the plane of the drawing.

A second magnet, in this case electromagnet 133, is attached to the base (not shown) at a position in close proximity to the permanent magnet 109. Electrical input leads carry an energizing current or drive signal to the coil of electromagnet 133. Together, the first and second magnets 109, 133 produce the motive force necessary to cause the vibration of the member 103 about the axis A and the corresponding reciprocal motion of the mirror 159.

The permanent magnet 109 is aligned so that the axis between its north and south poles is substantially perpendicular to the axis A and perpendicular to the axis of the coil of the electromagnet 133. For example, the axis of magnet 109 could be perpendicular to the plane of FIG. 2, and the axis of the coil would be in the plane of the drawing.

When a current is introduced through the coil of the electromagnet 133, interaction between magnetic fields of the coil and the permanent magnet 109 creates a torque causing the magnet 109 (with the attached second end of the member 103) to move from an equilibrium position. With the arrangement illustrated in FIG. 2, this interaction of the magnetic field of the coil with that of the permanent magnet creates torque tending to force the axis of magnet 109 in line with the axis of coil 133. This torque causes the member 103 to rotate about the axis A provided by the planar spring formed by flexible strips 121, 123. The springs 121, 123 supporting the first arm 105 of the member 103 twist or bend about the axis A and produce a return force. This return force is trying to bring the permanent magnet 109 back to the rest position. Reversing the polarity of the applied current will reverse the directions of the magnetic force and the opposing return force. Therefore, if the current applied to the coil of the electromagnet 133 takes the form of a cyclical AC signal, such as a sine wave, a pulse signal, a triangular wave, etc., the induced magnetic forces will produce an oscillatory movement of the permanent magnet 109 and rotational oscillation of the attached member 103. The flexible strip(s) twist back and forth about the axis A causing the member 103 to vibrate, and the mirror 159 reciprocates through the arc about the axis A. The arc of the mirror movement will pass back and forth through the plane of drawing FIG. 2.

Instead of using an alternating drive current, it is possible to use a pulse or half-wave signal at the same frequency and in phase with the characteristic vibration of the spring. The spring forces would produce an ongoing vibration, and the magnetic forces produced by the drive current would replace any mechanical energy lost by the vibration to thereby sustain the vibratory spring motion. The circuitry for producing this type of drive current may be easier to implement than the circuitry for generating the alternating type drive signal.

When the laser diode and focusing module 600 emits a light beam, the moving mirror 159 reflects the beam toward a target surface on which an indicia 70 appears. The reciprocal vibration of the mirror 159 causes the beam to scan a line to the left of the support structure 100 shown in the drawing. If FIG. 2 is a side view and the support structure 100 is oriented as shown, the resultant scan line would be horizontal and would scan an indicia 70 having vertical bars. The light reflected back by the indicia passes back through an ambient light blocking optical filter 156 for application to the detector 158. The detector 158, typically a photodiode, produces an analog signal proportional to the intensity of the reflected light which is processed, digitized and decoded in the usual manner.

FIG. 3 shows a scanning system similar to that of FIG. 2, but with a different orientation of the planar spring members to provide scanning in a different direction. Again, a laser diode and focusing module 600 produces the beam of light when current is applied to drive the laser diode 633. The mirror 159 redirects the beam toward the target surface and moves to provide the motion of the beam spot in a line or pattern across the target surface.

A support structure 200 provides flexible support for the mirror 159 so as to permit the necessary reciprocal motion of the mirror about an axis A' which is perpendicular to the plane of the drawing. In the embodiment of FIG. 2, the mirror support structure 200 includes U-shaped member 103 identical to that used in the embodiment of FIG. 2.

The free ends of the pair of flexible strips 121, 123 which form the planar spring are clamped between a plate 127 and a frame member 126 extending from the rear surface of first arm 105 by suitable fasteners (not visible in FIG. 3). A pedestal 135 is attached to a circuit board or metal sheet which forms a base for the system. The pedestal 135 has a stationary arm 137 which extends to a point within the U of the member 103 at a point between the axis A' and one of the arms, in this case between the axis and the second arm 107. In this embodiment, the opposite ends of the strips 121, 123 are clamped between an enlarged end of the stationary arm 137 and the plate 131 by suitable fasteners (not shown).

The components of the support structure 100, the mirror 159 and the magnet 109 are dimensioned such that the weight of the magnet balances the weight of the mirror with respect to an axis A' approximately half way between the mirror and the magnet in essentially the same manner as in the previous embodiment. As a result, the strips 121, 123 function as a planar leaf spring and flex about the perpendicular pivotal axis A'.

The first and second magnets 109 and 133 function essentially as they did in the embodiment of FIG. 2. Because of the orientation of the support structure 200 shown in FIG. 3, however, the magnet now has the axis between its north and south poles aligned in the plane of the drawing. When the alternating current is introduced through the coil of the electromagnet 133, interaction between magnetic fields of the coil and the permanent magnet 109 produce an oscillatory movement of the permanent magnet 109 and rotational oscillation of the attached member 103. The flexible strip(s) twist back and forth about the axis A' causing the member 103 to vibrate, and the mirror 159 reciprocates through the arc about the axis A'. The arc of mirror movement lies in the plane of drawing FIG. 3.

When the laser diode and focusing module 600 emits a light beam, the moving mirror 159 reflects the beam toward a target surface on which an indicia 70' appears. The reciprocal vibration of the mirror 159 causes the beam to scan a line to the left of the support structure 100 shown in the drawing. If FIG. 3 is a side view and the support structure 200 is oriented as shown, the resultant scan line would be vertical and would scan an indicia 70' having horizontal bars. The light reflected back by the indicia passes back through an ambient light blocking optical filter 156 for application to the detector 158. The detector 158 produces an analog signal proportional to the intensity of the reflected light which is processed, digitized and decoded in the usual manner.

Figure 1:
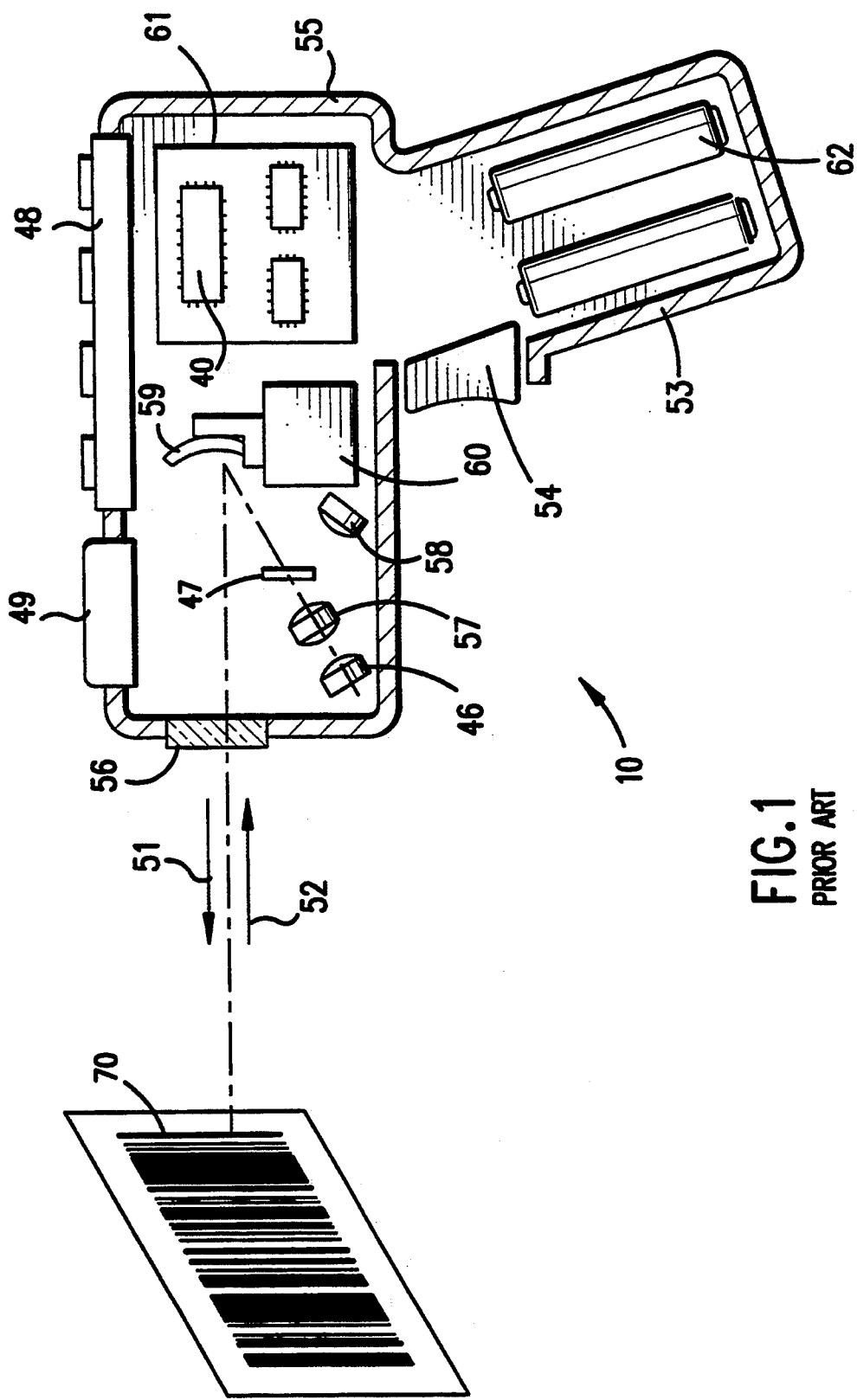
FIG. 1 illustrates a prior art handheld laser scanner and terminal device for scanning bar codes and inputting and displaying data.

As demonstrated by the two different layouts of the scanner support structure discussed above, one advantage of the inventive scanning component support structure is that it can be oriented in a variety of different ways to produce scanning in different directions. For example, if the system of FIG. 2 is incorporated into a handheld scanner of the type shown in FIG. 1, the resultant scan line would scan horizontally across the bar code indicia 70. In contrast, if the system of FIG. 3 were incorporated into a handheld scanner of the type shown in FIG. 1, the resultant scan line would scan vertically. Such a scan would permit reading of a code 70' oriented so that the bars are horizontal.

The flexible support structure 100 or 200 in the above discussed embodiments provides a scanning component structure which can be quite small but can still operate at the low scanning frequencies preferred for bar code scanning, typically 20 Hz or less. The location of the mirror and magnets at opposite ends of the member 103 positions the weight thereof relatively far from the axis. Consequently, the moving components exhibit a high moment of inertia. Also, the mass of the moving components is fairly large; and the preferred materials of the spring strips 121, 123 (i.e., Mylar TM and Kapton TM) tend to be quite flexible. As a consequence of the high mass, high inertia and spring flexibility, the system has a relatively low characteristic frequency of vibration.

The balancing of the weight of the mirror and the weight of the first magnet with respect to the pivot axis provides a precise scan motion without vibrations in any unwanted directions. If the components supported by the springs were not balanced, when the operator held the scanner so that the orientation of the axis was not precisely vertical, the weight of the effect of gravity of the components would move them out of position. As a result, the mirror would not be properly aligned with the fixed components, such as the laser diode and the window through which the beam exits the housing. The balancing of the moving parts also improves the efficiency of performance of the scanner.

Modular Preferred Embodiment

Figure 24:
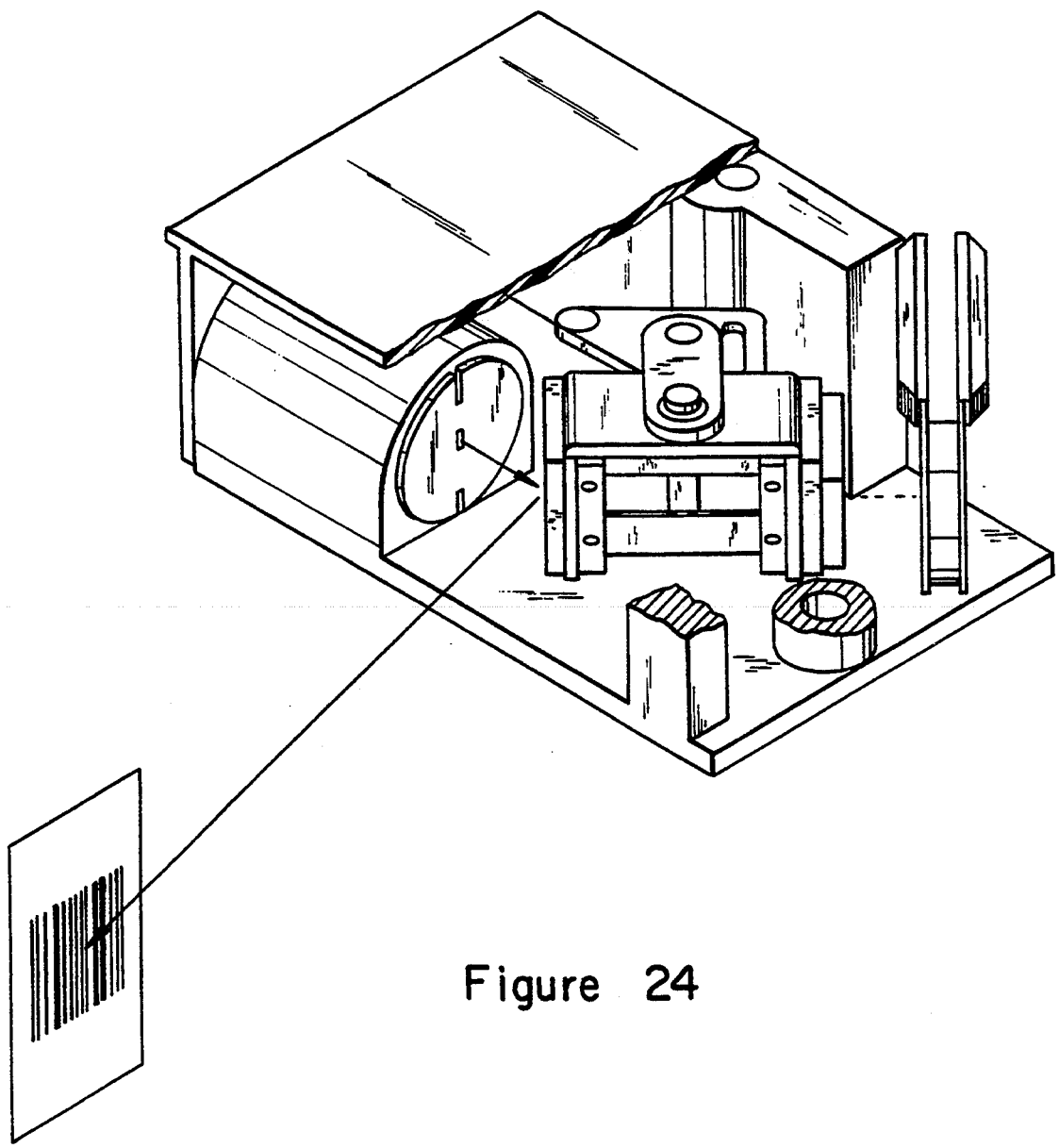
FIG. 24 is a perspective view of portions of a scan module of FIGS. 4–7.

FIGS. 4 to 9 show the construction of a small sized, self-contained, scanning module 400. The module 400 is substantially rectangular and in one example was made as small as 1.35"×0.95"×0.69". A perspective view of the module 400, with certain portions removed, is shown in FIG. 24.

Figure 7:
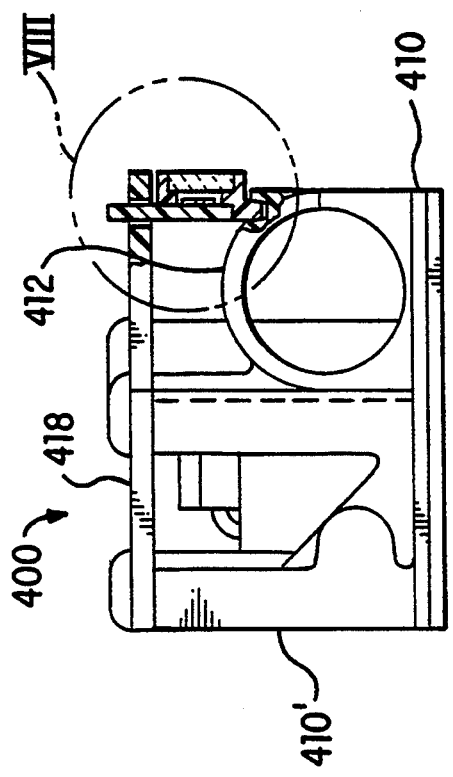

The module includes a metal base 410, typically formed of Aluminum. A circular housing 412 contains a laser diode and focusing module 600', similar to the diode and focusing module 600 discussed above (see FIGS. 4 and 6). FIG. 7 is an end view of the scanning module 400 with the first circuit board and the laser diode and focusing module 600' removed. As shown in that drawing, the circular housing 412 is integrally formed as a section of the metal base 410. The circular housing 412 serves as the laser diode holder of a laser diode and focusing module 600'. In this embodiment, the laser diode is press fit into the circular opening of the housing 412, from the end which appears as the lower end in FIGS. 4 and 6. A second member, holding the lens, telescopes into the circular housing 412 from the opposite end. During focusing, the second holder and lens are moved into the circular housing against the force of a biasing spring positioned between the laser diode and the lens. When proper focusing is achieved, the lens holder is fixed in position with respect to the laser diode and the circular housing 412, for example by injecting a glue. Because of the tight fit of the housing 412 about the laser diode and focusing module 600', the housing 412 and base 410 serve as a heat sink to dissipate heat generated by the laser diode during scanning operations.

FIGS. 5 and 6 show that the module 400 includes two circuit boards positioned at right angles to each other. A first circuit board 416, mounted orthogonal to the metal base 410 at one end thereof, supports part of the circuitry used by the scanner. Typically, the first circuit board 416 supports the circuitry for producing the current to drive the laser diode contained in the diode and focusing module 600'.

A second circuit board 418 is mounted orthogonal to the first circuit board and parallel to the metal base 410. Assuming that the flat major surface of the base 410 is the bottom of the module 400, the second circuit board would form the top of the module 400. A flexible electrical cable 417 connects the circuitry on the first and second circuit boards together. The second circuit board 418 supports the remainder of the necessary circuitry. Of particular note, the board 418 supports an application specific integrated circuit 419 which includes the analog processing circuitry, digitizer and may include microprocessor based decoder.

FIG. 4 is a top view of the module 400, taken as if the second circuit board were omitted, to provide an illustration of the interior of the module. As shown, a support structure 300 provides flexible support for the mirror 359 so as to permit the necessary reciprocal motion of the mirror. The support structure 300 is essentially similar to the structures of the earlier embodiments.

Figure 9:
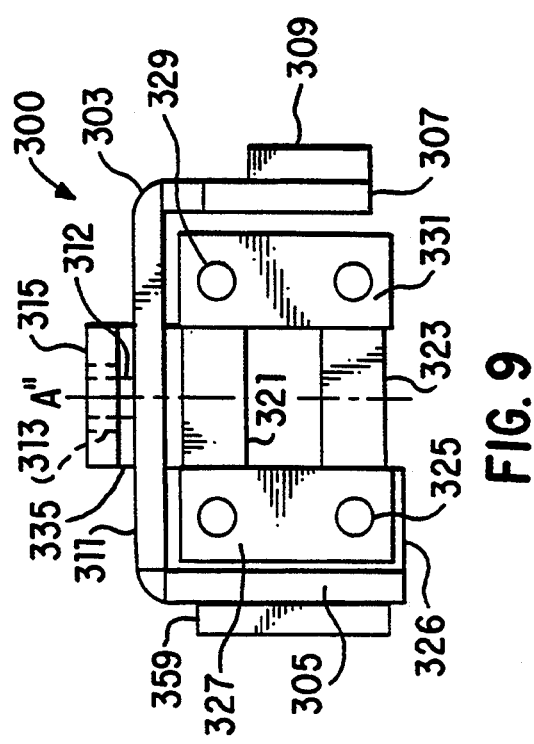
FIG. 9 is a side view of the mirror and magnet support structure of the scanning module of FIGS. 4 to 7.

As shown in FIG. 9, the mirror support structure 300 includes U-shaped member 303 having a first arm 305 to which the mirror 359 is attached. A second arm 307 of the member 303 supports the permanent magnet 309 and a straight section 311 extends between and connects the first and second arms together to form the U-shape of member 303.

A pair of flexible strips 321, 323 connect to one of the arms of the U-shaped member 303 and serve as the planar spring. Again, these spring strips comprise a flat sheet of a flexible plastic material such as Mylar TM or Kapton TM film, or other flexible elements such as a flat strip of non-magnetic metal like a beryllium-copper alloy. When the arm 303 is in its rest position (FIG. 4), the strips 321, 323 remain in a relatively unflexed state and extend in a direction substantially parallel to the straight section 311 in the space between the first arm 303 and the second arm 307 as shown in FIG. 9. The free ends of the strips 321, 323 connect to the first arm 305, and the opposite ends of the strips 321, 323 are held by a fixed support structure.

More specifically, the free end of the Mylar ™ or Kapton ™ material sheets forming the flexible strips 321, 323 are fastened by suitable fasteners 325 and thereby clamped between a plate 327 and a frame member 326 extending from the rear surface of first, arm 305 and a portion of the lower surface of the straight section 311. The opposite ends of the strips 321, 323 are fastened to a fixed support structure by suitable fasteners 329 which clamp the strips between a plate 331 (FIG. 9) and an enlarged portion of a stationary arm 337 extending out from the support pedestal 335 (FIG. 4). The support pedestal 335 is mounted on the flat section of the metal base 410.

The components of the support structure 300, the mirror 359 and the magnet 309 are dimensioned such that the weight of the magnet balances the weight of the mirror with respect to an axis A" approximately half way between the mirror and the magnet exactly as discussed above regarding the earlier embodiments. As a result, the strips 321, 323 function as planar leaf spring elements and flex about that pivotal axis. The pivot axis A" would extend perpendicular to the flat lower portion of the base 410 (or vertical in FIG. 9).

An electromagnet 333 is attached to the lower surface of the second circuit board 418 by a bracket 334 (FIG. 5). Mounting of the second circuit board 418 on the top of the module 400 positions the attached coil 333 in close proximity to the permanent magnet. 309, as shown in FIG. 4. The axis between the north and south poles of the permanent magnet 309 is aligned in the plane of drawing FIG. 4, i.e. parallel to the flat lower portion of the metal base 410. When the alternating current is introduced through the coil of the electromagnet 333, interaction between magnetic fields of the coil and the permanent magnet 309 produce an oscillatory movement of the permanent magnet 309 and a rotational oscillation of the attached member 303 against the return forces produced by the flat planar spring strips 321, 323. The flexible strips 321, 323 twist back and forth about the axis A" causing the member 303 to vibrate, and the mirror 359 reciprocates through the arc about the axis A".

When the laser diode and focusing module 600' emits a light beam, the moving mirror 359 reflects the beam toward a target surface on which an indicia appears. When viewed from above, as in FIG. 4, the mirror 359 reflects the light beam to the right of the module 400. The beam emerges through an opening 461 formed in the right side of the module (FIG. 6). Specifically, the opening 461 is formed between a support pedestal 463 formed on the metal base 410 and the circular housing 412 which contains the laser diode and focusing module 600'. The reciprocal vibration of the mirror 359, during emission of the beam from the laser diode and focusing module 600', causes the beam to scan a line to the right of the module 400 shown in FIG. 4.

If module 400 is horizontally mounted in a scanner (as if FIG. 4 is a top view) the resultant scan line would be horizontal and would scan an indicia having vertical bars. In contrast, if the module 400 is mounted vertically in a scanner (as if FIG. 4 were a side view) the resultant scan line would be vertical and would scan an indicia having horizontal bars.

Figure 8:
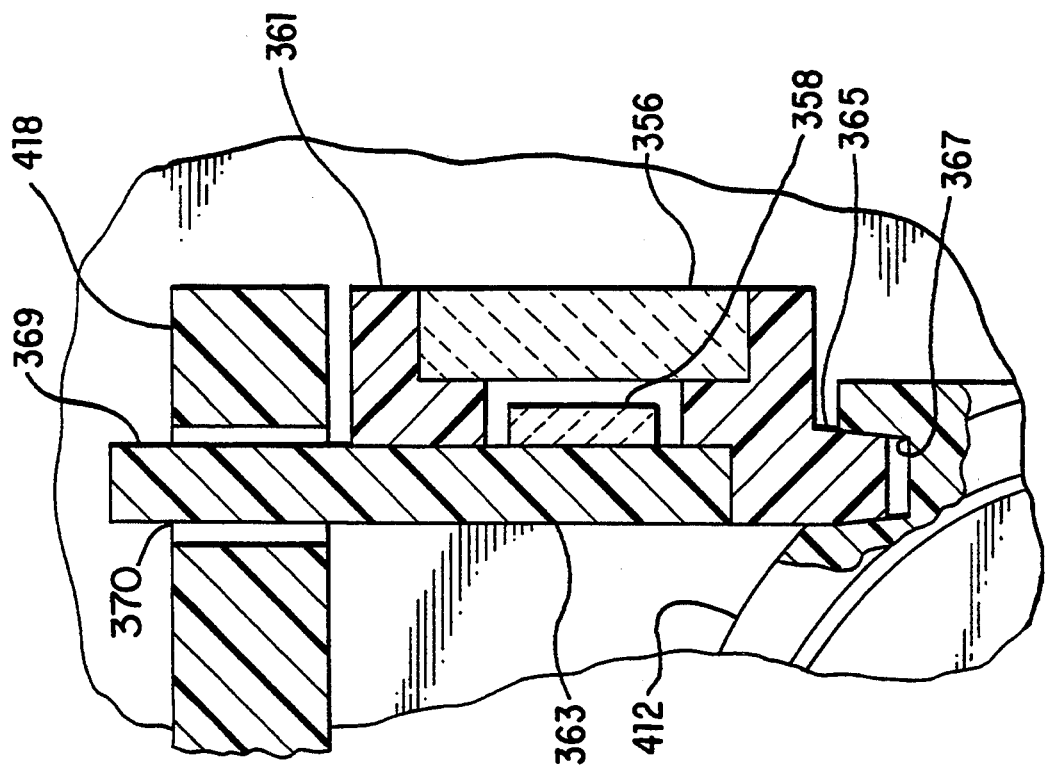
FIG. 8 is a detailed sectional view, corresponding to the circled portion of FIG. 7, providing a further enlarged illustration of the mounting of the filter and photodetector.

The light reflected back by the indicia passes back through an ambient light blocking optical filter 356 for application to the detector 358 (FIG. 8). The detector 358 is a linear array of photodiodes or one long photodiode indicated diagrammatically by the dotted line rectangle in FIG. 6. The filter 356 blocks most light wavelengths but passes light of a wavelength corresponding to the wavelength of the light beam emitted by the laser diode. As shown in FIG. 6, the filter 356 and the detector 358 extend above the opening 461. As such, the detector 358 and the filter 356 are orthogonal to both circuit boards 416, 418 and orthogonal to the flat major surface at the bottom of the metal base 410.

FIG. 8 provides an enlarged detailed illustration of the structure for supporting the filter 356 and the detector 358 corresponding to the circled portion of FIG. 7. As shown, a holder 361 supports the filter 356, and the detector 358 is attached to a back board 363 by glue or the like. When so assembled, the detector 358 projects into an opening through the holder 361 at a position behind the filter 356. The lower portion of the holder 361 includes an edge extension 365 which fits into a groove 367 formed in the side of the circular housing 412. The opposite end of the holder includes a similar edge extension which fits into a groove formed in the support pedestal 463.

Once the holder 361 and board 363 are assembled and the lower edge extensions are positioned in the grooves 367 in the circular housing 412 and the support pedestal 463, the circuit board 418 is secured on the vertical extension 410' of the metal base. The upper end of the back board 363 includes three pins 369 which protrude through corresponding openings 370 in the second circuit board 418. Thus, the second circuit board 418 clamps the assembly formed by board 363 and holder 361 into position along the upper right side of the module 400 (see FIGS. 6 to 8).

The detector 358 produces an analog signal proportional to the intensity of the reflected light which is processed, digitized and may be decoded by the application specific integrated circuit 419. Electrical leads for carrying signals from the diodes of the detector array 358 to the application specific integrated circuit 419 run along the back board 363, the pins 369 and the second circuit board 418.

In this embodiment, the U-shaped member 303 also has a pin 312 extending upward from the straight section 311 (FIGS. 4 and 9). The pedestal 335 has a cap plate 315 attached at the top of the pedestal. The cap plate 315 extends over the U-shaped member 303 such that the pin 312 is located in an opening 313 formed in the cap plate 315. The opening 313 is somewhat larger than the pin 312. As a result, the inner surface of the opening does not engage the pin 312, and the pin and opening do not act as a pivot point during normal scanning operations. The opening 313 does, however, serve to limit lateral motion of the pin 312 and the attached arm 303. Together the pin and opening serve as a stop to limit displacement of the scanning component. As a result, if the scanning module 400 is dropped or otherwise subjected to a shock, the weight of the mirror and magnet can not force the springs 321 to bend to such an extreme degree in any lateral direction as to cause permanent deformation or other damage to those springs.

The small size of the flexible support structure 300 provided in the scanning module does not prevent operation at low scanning frequencies. Again, the location of the mirror and magnet at opposite ends of the member 303 positions the weight thereof relatively far from the axis thereby providing a high moment of inertia. Also, the mass of the moving components is fairly large; and the preferred materials of the springs 321, 323 tend to be quite flexible. The high mass, high inertia and spring flexibility, cause the flexible support structure to exhibit a relatively low characteristic frequency of vibration. Thus the small self-contained scanning module 400 operates at the low scanning frequencies preferred for bar code scanning, such as 20 Hz or less. Also, the module 400 incorporates the balancing of the weight of the mirror and the weight of the first magnet which reduces or eliminates undesirable vibrations which might disrupt the scanning motion and minimizes the amount of power which must be applied to initiate motion of the scanning component, making the scanner more efficient.

Alternate Embodiment of Flexible Support Structure

Figure 10:
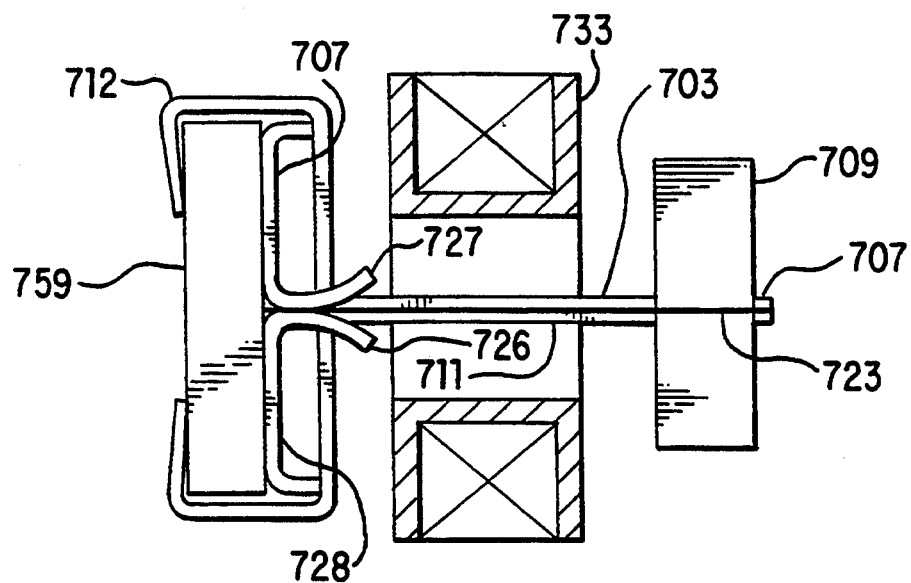
FIG. 10 is a side view of a subassembly for use in another embodiment of the present invention; without the fixed support structure and with the electromagnet shown in cross section.
Figure 11A:
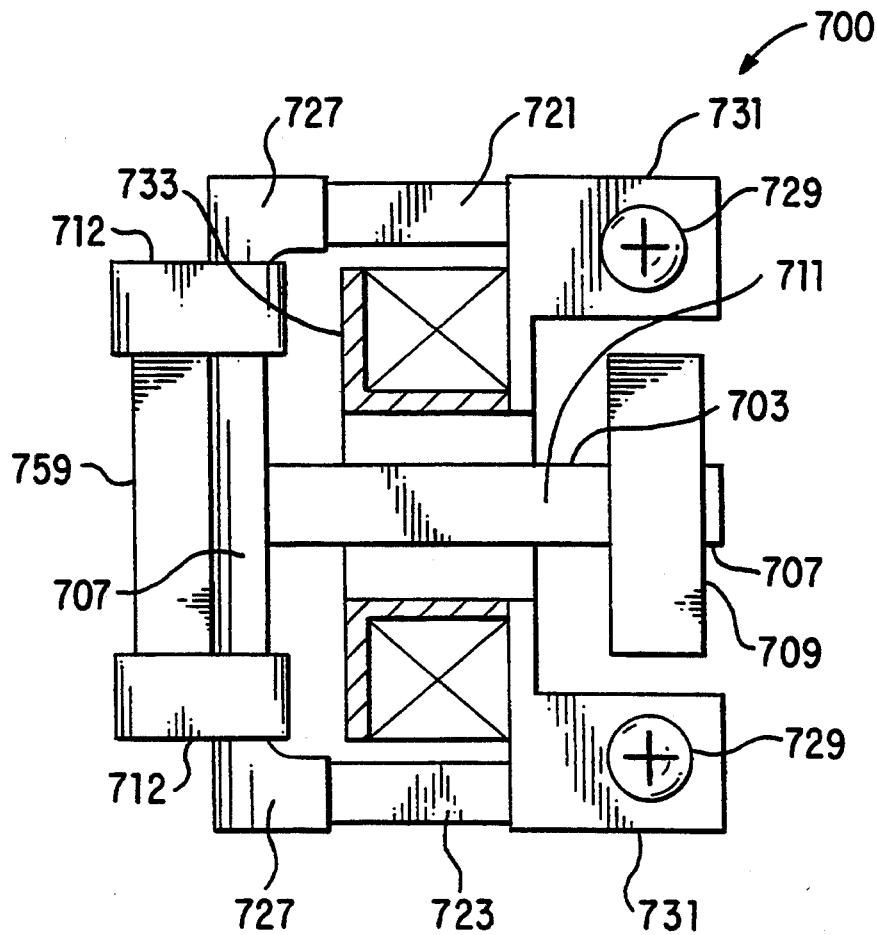
FIGS. 11(A) and 11(B) are top and side views, respectively, of a scanning motor incorporating the subassembly illustrated in FIGS. 10.
Figure 11B:
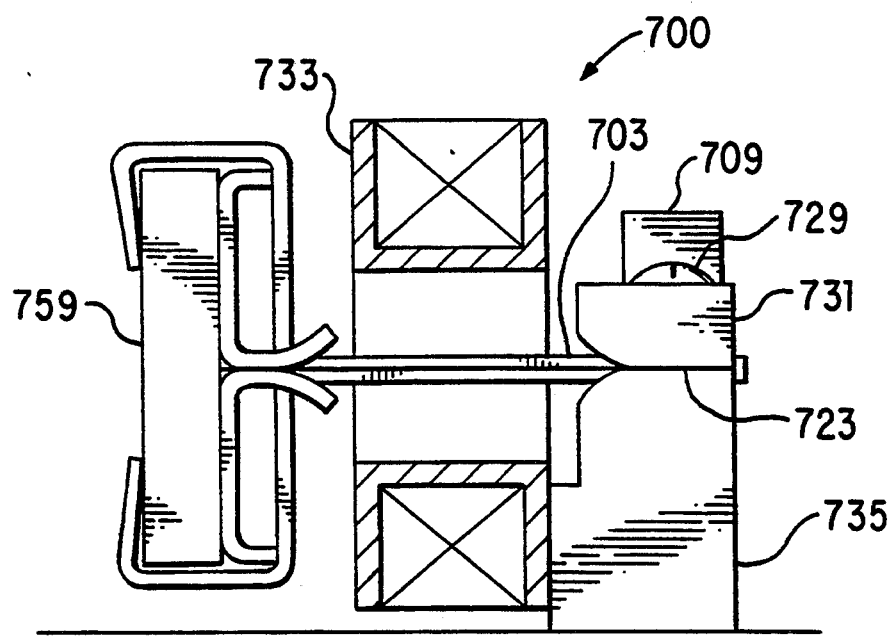

FIGS. 10, 11(A) and 11(B) depict a modified of the flexible support structure which further reduces; the size of the scanner by placement of the electromagnet 733 at a position between the positions of the permanent magnet 709 and the mirror 759. FIG. 10 provides a side view of this embodiment, with the coil shown in cross section and without the structure for supporting the free ends of the flexible strips and the coil. FIGS. 11(A) and 11(B) are top and side views, respectively, showing the subassembly of FIG. 10 mounted on an appropriate stationary support, structure.

In this latest embodiment, a flexible support, structure 700 includes a T-shaped member 703 (see FIG. 11(A)). The member 703 includes a straight section 711, and a cross bar element 707 at a first end of the straight section 711. When the flexible strips 721, 723 are unflexed, so that the mirror 759 is at its rest position, the straight section 711 lies along the axis of the opening through the bobbin of electromagnet 733 (FIG. 10 or 11(B)).

As shown in FIGS. 10 and 11(A), the second end 707 of the straight section 711 projects through the permanent magnet 709. The magnet 709 press fits onto the second end 707 of the straight section 711 or is glued or otherwise attached to the second end of the straight section 711 for movement therewith.

The cross bar element 707 carries the mirror 759. Specifically, the cross bar element 707 curves vertically to form a first flexible strip retainer (FIG. 10). The opposite lateral ends 727 of the cross bar element 707 extend back (FIG. 11(A)) and curve upward (FIG. 10). The support structure 700 also includes a second flexible strip retainer 728. The opposite ends 726 of the second flexible strip retainer 728 extend back in a manner similar to the ends of the cross bar element 707 shown in FIG. 11(A). The opposite ends 726 of the second flexible strip retainer 728 also curve downward as shown in FIG. 10.

A pair of spring clips 712 encircle the mirror 759, the first retainer clip of crossbar 707 and the second flexible strip retainer clip 728 to form an assembly as shown in FIG. 10. The cross bar element 707, the second flexible strip retainer 728 and the spring clips 712 all consist of a non-magnetic metal such as a beryllium-copper alloy. The spring clips together with the two retainers fasten the mirror to the cross bar of the T-shaped member 703.

Also, the free ends of the flexible strips springs 721, 723 are clamped between the curved ends 727 of the cross bar element 707 and the corresponding curved ends 726 of the second retainer 728 by the compressive force provided by the spring clips 712 (see FIG. 10). The opposite ends of the strips 721, 723 serve as fixed ends and are fastened to a fixed support structure by suitable fasteners 729 shown as Phillips head screws. The fasteners 729 clamp the fixed end of each of the flexible spring strips 721, 723 between one of the plates 731 and a support pedestal 735 extending upward from a base (shown as a solid line at the bottom of FIG. 11(B)) on which the system is mounted.

Again, the components are dimensioned such that the weight of the magnet 709 balances the weight of the 759 mirror with respect to an axis approximately half way between the mirror and the magnet. As a result, the strips 721, 723 function as planar leaf spring elements and flex about that axis. Vibration of the T-shaped member 703 on the spring strips 721, 723 produces reciprocal movement of the mirror 759 up and down through an arc about the axis. The arc would lie in the plane of drawing FIG. 11(B).

FIG. 11(A) shows that the electromagnet 733 is essentially concentric about the straight section 711 of member 703, and the planar spring strips 721, 723 pass on either side of the electromagnet 733. The electromagnet 733 may be attached to a surface of one or both of the pedestals 735, or the electromagnet 733 may be attached to the base.

The first and second magnets 709 and 733 function essentially as did the first and second magnets in the embodiment of FIG. 3. The permanent magnet 709 has the axis between its north and south poles aligned vertically, e.g. in the plane of drawing FIG. 11(B). When the alternating current is introduced through the coil of the electromagnet 733, interaction between magnetic fields of the coil and the permanent magnet 709 produce an oscillatory movement of the permanent magnet 709 and rotational oscillation of the attached member 703. The flexible strips twist back and forth about the balance axis between the mirror and magnet causing the member 703 to vibrate, and the mirror 759 reciprocates through the arc about the axis.

A laser diode, such as shown in the earlier embodiments, emits a light beam towards the moving mirror 759. Mirror 759 reflects the beam toward a target surface on which an indicia appears. The reciprocal vibration of the mirror 759 causes the beam to scan a line to the left of the support structure 700 shown in the FIG. 11(B). If the support structure 700 is oriented as shown in the side view of FIG. 11(B), the resultant scan line would be vertical. If the support structure is turned 90° (as if FIG. 11(B) were a top view), the resultant scan line would be horizontal. The light reflected back by the indicia would be detected and the detector signals processed, digitized and decoded in the usual manner.

The radius of curvature of each of the curved ends 727 and 726 of the cross bar element and the second retainer is the same as the radius of curvature of lower surface of plates 731 and the upper surface of the support pedestals 735. If the scanner receives a vertical shock, such as caused by dropping the scanner, the weight of the components supported by the planar spring strips 721, 723 will exert a strong downward force causing these springs to deform around one or more of these curved surfaces. The radii of the curves of these components therefore limit the curvature of such spring strips 721, 723 which might result if the operator accidentally drops the scanner. For any planar spring of a given material and thickness, a minimum radius of curvature exists beyond which the spring can not bend without damaging the spring. Thus, if the planar springs 721, 723 were to bend into a curved shape of a radius less than the minimum radius of the spring material, the spring material thereof would be permanently deformed. To prevent such damage, the radii of the curved ends 727 and 726 and the radius of curvature of lower surface of plates 731 and the upper surface of the support pedestals 735 all are greater than the minimum radius for the Mylar TM or Kapton TM type planar springs 721, 723. Although not discussed specifically above, the earlier embodiments may include similarly curved surfaces formed at appropriate locations on the various clamping plates and support arms or pedestals.

Two-Dimensional Scanning

Figure 12:
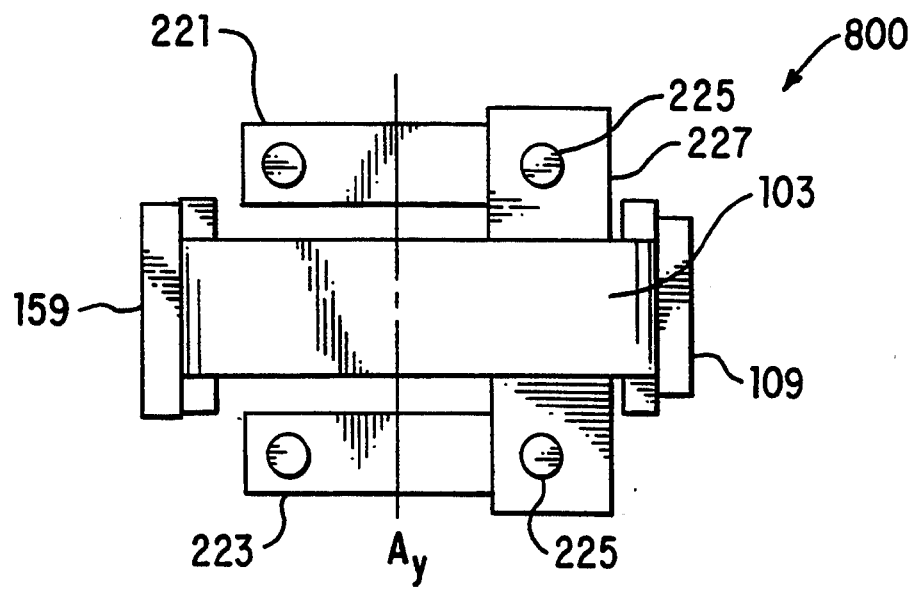

FIGS. 12 to 14 illustrate a modification of the flexible support structure to provide beam spot scanning in two directions which are substantially orthogonal to each other. A number of different scanning applications call for scanning in two different directions. One such application provides a scan pattern which moves across a bar code type indicia to find portions thereof which are sufficiently intact to permit an accurate reading of the code. This bi-directional scanning application will be discussed in more detail below with regard to the embodiment of FIGS. 17 to 23. Other bi-directional scanning applications relate to scanning of indicia encoded in two different dimensions. The embodiment of FIGS. 13 to 15 generally will be discussed with regard to this later type of scanning application.

A two-dimensional bar code comprises a series of rows or lines of optically encoded information. In the rows are oriented in the X-direction (horizontal), the rows are located one above another in the Y-direction (vertical). Each row or line of information comprises a series of encoded symbols, and each symbol consists of a series of light and dark regions, typically in the form of rectangles. The widths of the dark regions, the bars, and/or the widths of the light spaces between the bars indicate the encoded information on each row or line. Two-dimensional bar codes can carry considerably more encoded information than the common one-dimensional codes.

To read a two-dimensional indicia, it is desirable to scan the indicia with a raster or similar type of scan pattern. In such a scan pattern, a fairly large number of substantially horizontal and substantially parallel scan lines traverse the indicia from an upper horizontal scan line, proceeding downwardly with a multiplicity of intermediate horizontal scan lines to a lower horizontal scan line to uniformly cover a desired scan area encompassing the indicia. In order to obtain such a raster-type scan pattern, the scanning component must be supported for reciprocal motion in two different directions. Also, the frequency of oscillation in a first direction producing the X-direction spot scanning motion typically is considerably higher than the frequency of oscillation in a second direction producing the Y-direction spot scanning motion.

The sub-assembly 800 shown in FIGS. 10 and 11 includes the U-shaped member 103 supporting mirror 159 and permanent magnet 109. The free first ends of the flexible strips 121, 123, are attached to the arm which supports the mirror 159 by fasteners 125, the plate 127 and a frame member. These elements all are identical to the correspondingly numbered elements in the embodiment shown in FIG. 2. Recall that the embodiment of FIG. 2 included a fixed structure supporting the opposite ends of the flexible strips 121, 123. In contrast, in the two-dimensional scanner of FIGS. 12–14 the opposite ends of the flexible strips 121, 123 are flexibly supported to permit motion of the strips and the U-shaped arm 103 supported thereby in a second direction.

More specifically, in this embodiment, the second ends of the flexible strips 121, 123 are fastened to a flexible support structure by suitable fasteners 129 and thereby clamped between a pair of plates 131'. One of the support plates 131' is visible in FIG. 13, and the other support plate is located on the opposite side of the strips behind the illustrated plate and therefore is not visible in FIG. 13.

The flexible support structure 800 also includes a second set of flexible strips 221, 223 forming a second planar spring. In the preferred form, the flexible strip(s) 221, 223 each comprise Mylar TM or Kapton TM film, but other flexible elements could be used such as a flat strip of non-magnetic metal like a beryllium-copper alloy by suitable fasteners 225. The free first ends of the pair of flexible strip springs 221, 223 are clamped between a pair of plates 226 and 227 by suitable fasteners 225. On each side of the sub-assembly 800, one of the two plates 226, 227 is attached to and extends out from the surface of one the plates 131'.

As a result of this connection structure, the second pair of planar flexible strips 221, 223 are located on opposite sides of the U-shaped member 103 and the first pair of flexible strips 121, 123. However, the flat plane of the second pair of planar flexible spring strips 221, 223 is orthogonal to the flat plane of the spring formed by the first pair of flexible strips 121, 123. The strips 221, 223 are the same length as or somewhat shorter than the strips 121, 123.

FIG. 14 depicts a beam scanning module incorporating a laser diode and focusing module 600, identical to that used in the first two embodiments, and the subassembly 800 illustrated in FIGS. 10 and 11. As shown in FIG. 14, pins 229 or other suitable fasteners serve to clamp the second ends of the planar springs 221, 223 between plates 231 and pedestals 235. A frame 528 supports the pedestals 235 and through them the attached subassembly 800. An extension at one end of the frame 528 also supports the electromagnet 133 at a fixed position in close proximity to the permanent magnet 109 of the sub-assembly 800.

The components of the sub-assembly 800 balance in a manner similar to that of the components in the earlier embodiments, but in this case the components balance with respect to two orthogonal axes. The balancing of the weight of the mirror 159 by the weight of the magnet 109 will cause the first pair of planar flexible strips 121, 123 to flex about an axis $A_x$ approximately half the distance between the mirror and the magnet. The weight balancing will also cause the second pair of planar flexible strips 221, 223 to flex about an axis $A_y$ approximately half the distance between the mirror and the magnet. The two axes $A_x$, $A_y$ are orthogonal with respect to each other. In this embodiment, the axis $A_x$ will be a vertical axis and the axis $A_y$ will be horizontal.

Reciprocal flexing of the planar spring formed by the first pair of flexible strips 121, 123 about the vertical axis $A_x$ will cause vibration of the U-shaped member 103 and reciprocal movement of the mirror 159 back and forth through a horizontal arc about the axis $A_x$. Similarly, reciprocal flexing of the second pair of flexible strips 221, 223 about the horizontal axis $A_y$ causes vibration of the U-shaped member and corresponding reciprocal movement of the mirror 159 up and down through a vertical arc about the axis $A_y$.

To produce desirable two-dimensional scanning patterns, the vibrational movement about the $A_x$ axis should be at a higher frequency than the vibrational movement about the $A_y$ axis. In general, when a spring must move a higher mass it vibrates at a lower frequency. In the system of FIG. 14, the first pair of planar flexible strips 121, 123 carry the mass of the magnet 109, the U-shaped member 103 and the mirror 159 together with the pins 125, frame member and plate 127 which attach those springs to the member 103. In addition of this mass, the second pair of flexible strips 221, 223 carry the mass of the first strips, 121, 123, and the various plates and pins which connect the second ends of the strips 121, 123 to the free end of the second pair of flexible strips 221, 223. As a result, the mass moved by the second planar spring formed by flexible strips 221, 223 is somewhat higher than the mass moved by the first planar spring formed by flexible strips 121, 123. For some desired patterns, such as the progressing zig-zag pattern discussed in more detail below (with regard to FIGS. 17–23), the difference in vibration frequencies caused by these mass differences may be sufficient.

To generate a raster type pattern for reading two-dimensional indicia, the vibrational movement about the $A_x$ axis should be at a much higher frequency than the frequency of vibrational movement about the $A_y$ axis. In general, stiffer springs vibrate at higher frequencies than more flexible springs, therefore the first pair of flexible strips 121, 123 should be stiffer than the second pair of planar flexible strips 221, 223. If the various planar spring strips are all made of the same material, the first pair of flexible strips 121, 123 should be thicker than the second pair of flexible strips 221, 223. Alternatively, the first pair of planar flexible strips or springs 121, 123 may consist of a relatively stiff spring material, for example a flexible non-magnetic metal such as a beryllium-copper alloy. The second pair of planar flexible strips or springs 221, 223 would then consist of a more flexible plastic material e.g. Mylar ™ or Kapton ™. For raster scanning of a two-dimensional bar code, the second pair of planar springs 221, 223 will vibrate at a characteristic frequency in a relatively low range of frequencies, such as within the range of about 5 to 15 Hz. In contrast, the first pair of planar springs 121, 123 will vibrate at a characteristic frequency in a relatively high range of frequencies, such as within the range of about 200 to 800 Hz.

The oscillatory forces applied to the single permanent magnet 109 by the electromagnet. 159 can initiate the desired vibrations in both pairs of the spring strips 121, 123 and 221, 223 by using the proper orientation of the poles of the permanent magnet and by carefully selecting the drive signal applied to terminals 220 to drive the coil of the electromagnet 214.

The electromagnet 133 comprises a core or bobbin around which a coil is wound. When there is no current through the coil, the resilient nature of the first and second pairs of planar springs causes the mirror 159 and magnet 109 to return to the rest position. When a current is introduced through the coil, interaction between magnetic fields of the coil and the permanent magnet 109 creates a moment of force moving the magnet 109 away from its equilibrium position. In this embodiment, the axis between the poles of the permanent magnet 109 is at approximately a 45° angle between the pivotal axes $A_x$ and $A_y$ (i.e. at a 45° angle out of the plane of FIG. 14). As a result, forces applied to that magnet will include a vector orthogonal to each axis of rotation and will move the magnet away from its rest position with respect to both axes. As a result of such motion, a spring force is produced by the first pair of planar spring strips 121, 123 and a spring force is produced by the second pair of planar spring strips 221, 223. These spring forces oppose the motion and tend to bring the permanent magnet 109 back to the rest position. Reversing the polarity of the applied current will reverse the directions of the magnetic forces and the opposing spring forces. Therefore, if the current applied to the coil of the electromagnet 133 takes the form of a cyclical AC signal, such as a sign wave, a pulse signal, a triangular wave, etc., the induced magnetic forces will produce an oscillatory movement or vibration of the permanent magnet 109 about both axes $A_x$ and $A_y$.

To produce the two different frequencies of motion about the two different axes, the drive signal applied to the electromagnet comprises a superposition of two cyclical signals of different frequencies. The first signal component has a frequency within the high range of frequencies corresponding to the characteristic vibration frequency of the first pair of springs 121, 123. The second signal component has a frequency within the low range of frequencies corresponding to the characteristic vibration frequency of the second pair of planar springs 221, 223. Thus the vibratory magnetic forces applied to the permanent magnet 109 will include the two different frequency components corresponding to the two component signals in the drive signal. Because of the different characteristic frequency of vibration of the two sets of spring strips, each planar spring formed by one pair of strips will vibrate only at its natural vibration frequency in response only to the force vector orthogonal to its corresponding pivotal axis. Thus when the electromagnet 133 is driven by such a superposition signal, the first pair of planar spring strips 121, 123 will vibrate about the $A_x$ axis at a frequency in the high range of frequencies, and the second pair of planar spring strips 221, 223 will vibrate about the $A_y$ axis at a frequency in the low range of frequencies.

As depicted in FIG. 14, the laser diode and focusing module 600 produces a light beam which is reflected from the oscillating mirror 159. The mirror 159 oscillates in two orthogonal directions at the two different frequencies, as discussed above. This oscillation of the mirror 159 causes the reflected beam 51 to scan back and forth in the X-direction and up and down in the Y-direction in a raster pattern across the surface on which the two-dimensional bar code appears. The light reflected back by the indicia would be detected, and the detector signal proportional to the intensity of the reflected light would be processed, digitized and decode in the usual (by a detector and processing circuitry not shown).

Incorporation of Scanner Module Into a Stylus

Because of the small size, light weight and robust construction of the scanner modules incorporating the flexible support structures of the present invention, any of the embodiments of the present invention discussed above can be mounted, worn or held by an operator in a wide range of positions. For example, a scanner module, such as 400 shown in FIGS. 4 to 7, could be mounted so that the operator could wear the module on a helmet, eye glasses, an arm band, bracelet or ring, etc. The module could easily fit in a handheld scanner similar to that shown in FIG. 1. Alternatively, the module could be part of a fixed installation scanner.

In one preferred embodiment, shown in FIGS. 15 and 16, a beam scanner module 400' is incorporated into a writing instrument 750. The module 400' could be essentially identical to the module 400 in which case the detector and all processing circuitry for beam scanning are components of the module. Alternatively, as illustrated in FIG. 15, the detector may be a separately mounted component of the system. The module 400' would include at least the laser diode and focusing module, the mirror, the structure for supporting the mirror for motion in one or two desired directions, and the first and second magnets for producing such motion at the desired frequencies in response to an appropriate drive signal.

With reference to FIG. 15, the instrument 750 includes a pen shaped housing 751 having a tapered tip at one end, an enlarged section at an end opposite the tapered tip, and an elongated body between the ends. The tip end of the pen would include the necessary stylus electronics 752, and the scanner module 400' is mounted at one end of a circuit board 753 to position the module in the enlarged rear section of the stylus housing 751. The circuit board 753 could also support any additional circuitry needed for generating or processing signals related either to the scanning operation or writing operations of the stylus, as needed.

A light-transmissive window 756 allows the outgoing light beam from the beam scanner module 400' to exit the housing 751. The beam of light travels along a light path extending along an outer surface of the body of the housing 751 toward a target surface on which optically encoded indicia 70 appears.

The light reflected back by the indicia passes back through an ambient light blocking optical filter 756' for application to the detector 758. As shown, the filter and the detector are mounted at or near the tapered tip of the pen shaped housing 751. The detector 758 produces an analog signal proportional to the intensity of the reflected light which circuitry in module 400' or mounted on circuit board 753 processes, digitizes and decodes in the usual manner.

A manually actuable switch 754 is mounted on a side surface of the body of the pen, at a point near the tapered tip (FIG. 16). Consequently, the switch is out of line of the light path. An operator holding the pen in her right hand would actuate the switch with her fore finger. An operator holding the stylus in his left hand would actuate the switch with his thumb. In either case, because of the position of the switch 754, the finger which actuates the switch will not obstruct the path of the light beam along the outer surface of the body of the housing 751. Operation of the switch activates the beam emission and scanning components of the module 400' and the detector 756 and associated signal processing and decoding circuitry to initiate reading of the optically encoded indicia 70.

Moving spot scanners will typically have a "dead zone" close to the window of the scanner in which the device can not scan indicia because the scan line is shorter than the width of the indicia. It is often most convenient, however, for the operator to hold the nose or tip of the scanner quite close to the indicia during scanning. When arranged in a pen or stylus as shown, most if not all of the "dead zone" of the scanner module 400' is along the length of the body of the pen shaped housing 751. Consequently, the operator can hold the tip of the stylus 750 relatively close to the indicia 70, and the scanner can still obtain an accurate valid reading of the indicia.

As shown in FIG. 16, the stylus, including the scanner module 400', connects to the separate tablet 775 via a cable 757. The writing tablet is sensitive to contact or pointing of the stylus tip at positions on the tablet to derive positional data, and the tablet displays information related to the derived positional data. For example, the tablet may include a resistive contact type input screen, for electronically determining an X,Y position at which the pen tip contacts the tablet surface, and an associated display device, such as those disclosed in U.S. Pat. No. 4,972,496. Alternatively, the stylus electronics could rely on a light pen technology, on capacitive contact detection circuitry, pressure sensitive contact detection circuitry, ultrasonic proximity detection circuitry, etc. In each case, the key feature is that the stylus 750 incorporates both the electronics necessary to provide X,Y position data input tim the corresponding type of electronic tablet 775 and a beam scanner module 400' of one of the types discussed herein.

In the embodiment of FIG. 16, the cable 757 carries the digital data representing the decoded characters to the associated computer, e.g. via the connection to the display and resistive stylus input tablet. In such a case, the stylus 750 typically receives power supply voltage from an external source such as the system power supply via the cable 757 connection to the tablet 775. Alternatively, the stylus may include an internal battery power supply and a wireless transmitter. The transmitter could be a radio transmitter, an infrared transmitter, an ultrasonic transmitter or any other type wireless transmitter. The transmitter sends analog or digital signals resulting from the scan of the optically encoded indicia 70 to the associated computer system. In this later case, the cable connection to the tablet 775 would be unnecessary and the operator would not need to hold the tablet during extended scanning operations.

Progressive Line Motion Scanner

FIGS. 17–23 depict an embodiment of the present invention for producing beam spot scanning motion in two different directions. In this embodiment, however, the scanning pattern is a moving truncated zig-zag pattern, rather than a raster pattern.

Indicia printed using low quality printing techniques often include numerous printing defects. Such defectively printed codes and damaged or scratched indicia often will include a truncated bar code region which is still sufficiently intact and/or accurately printed to permit reading. There is also a trend toward making bar codes smaller, so that the code occupies less surface area and is less visually obtrusive. Reading of any such small or truncated code is successful, however, only if one or more scan lines exactly cross the intact truncated code. With typical scanners which repeatedly scan only a single scan line, this requires careful aiming so that the line crosses the truncated code and may require that the operator hold the scanner so that the scan line crosses the code at some angle other than the typical horizontal angle.

The present embodiment of the invention overcomes such difficulties by producing a zig-zag pattern which automatically progresses across the code until one or more lines scan an intact portion of the code. Such a pattern includes horizontal lines and angled diagonal lines. As the pattern progresses across the truncated code, eventually one of the scan lines will align properly with the intact truncated portion of the code and thereby produce an accurate valid read result.

Figure 17:
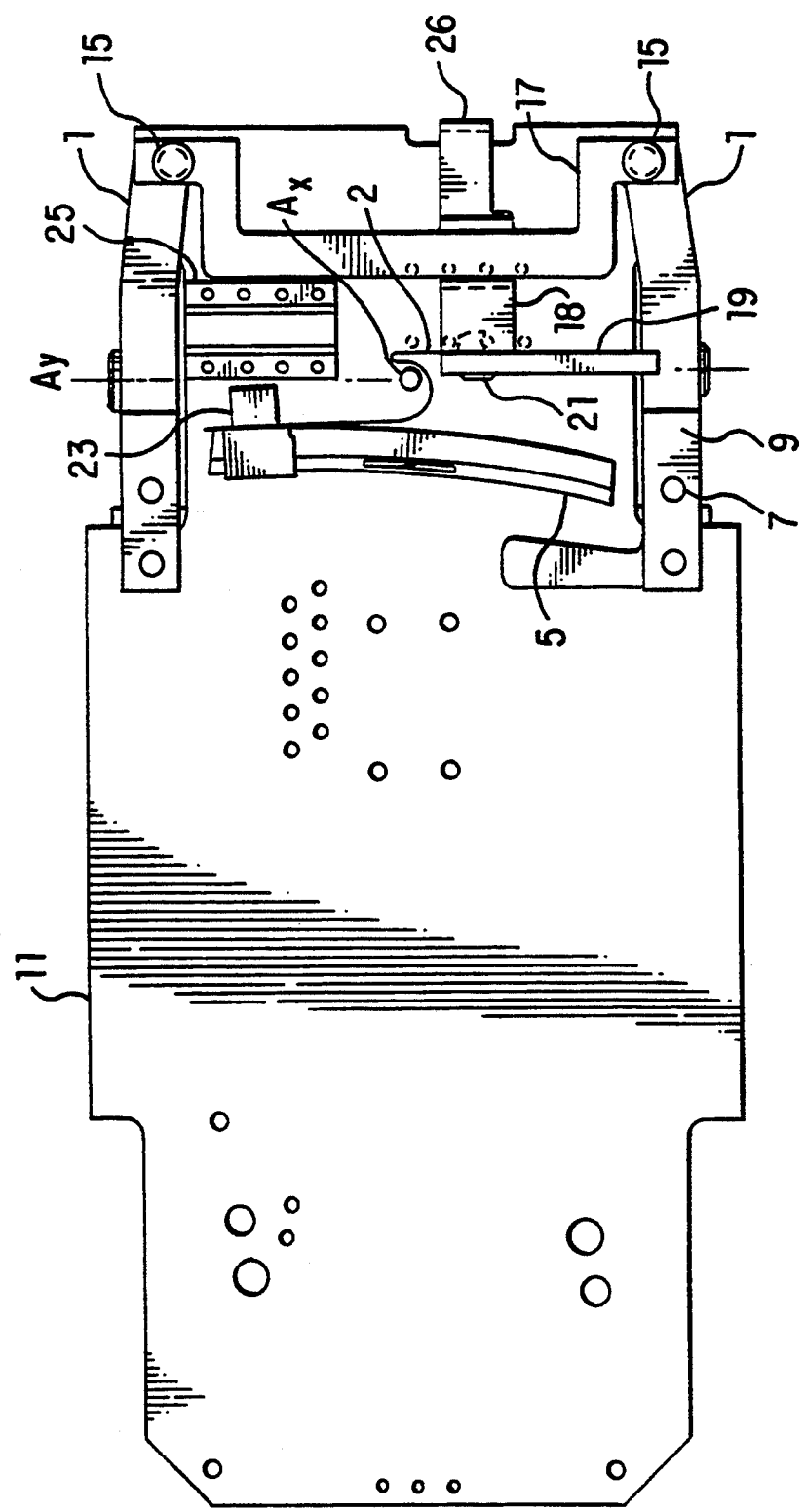
FIGS. 17 and 18 are top and side views, respectively, of a circuit board and scanning engine for use in another embodiment of the present invention which produces a high speed scan in two directions so that lines of the pattern progress across a bar code.

FIG. 17 provides a top view of the scanning engine components of the present embodiment. A circuit board 11 supports the scanning engine near one end thereof. As will be discussed later, the laser diode type emitter and the detector are mounted at the opposite end of the circuit board 11. As in the earlier embodiments, this scanning engine uses a mirror 5 as the component which moves to produce the desired beam scanning motion. The mirror 5 is rather long and slightly curved, when viewed from above, to concentrate reflected light toward the detector. When viewed from the side, e.g. the left side of FIG. 17, the mirror appears as a long narrow rectangle.

The scanning engine includes two different spring support structures for providing reciprocal motion of the mirror 5 in the two desired orthogonal directions. The spring 2 flexes about a first axis $A_x$ to produce substantially horizontal motion of the mirror 5, and a pair of leaf springs 1 flex about an axis $A_y$ to produce substantially vertical motion of the mirror 5. The spring 2 is attached to the mirror 5 at one end thereof, in a manner to be discussed in more detail below.

Figure 18:
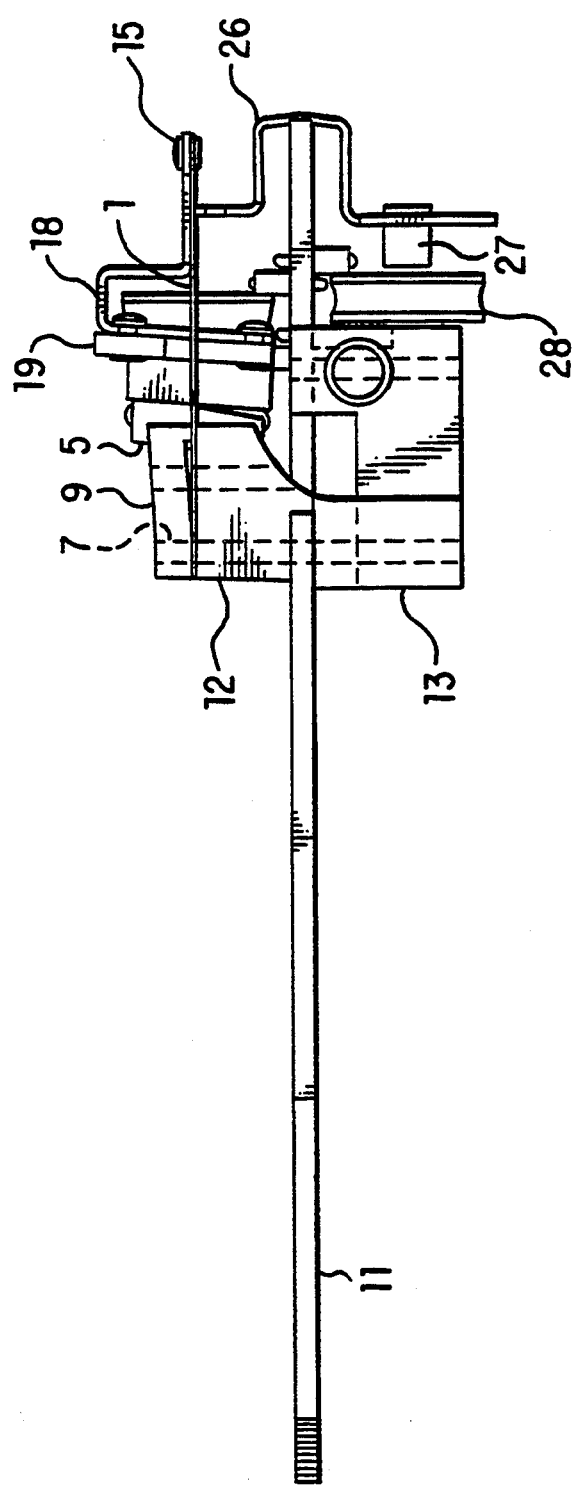

A "fixed" end of each of the leaf springs 1, formed of a beryllium-copper alloy or similar flexible non-magnetic material, is fastened by pins 7 or other suitable fasteners to thereby clamp the end of the spring between a plate 9 and one of two engine holders 12 (only one of which is visible in FIG. 18). At least one of the pins 7 extends through the circuit board 11 and engages a support block 13 which extends across the lower surface of the circuit board 11 to securely attach both of the engine holders 12 to the board.

Rivets 15 connect a bracket 17 between the "free" ends of the two leaf springs 1 (FIG. 17). The bracket 17 includes an extension 18 for supporting the spring 2. A first arm of the spring 2 is fixed by fasteners, such as rivets 21 and thereby clamped between the bracket extension 18 and a mirror support clamp 19.

In addition to clamping the spring 2 to the extension 18, the mirror support clamp 19 serves as a balance member. Specifically, the mirror support clamp 19 extends in a direction opposite the spring 2 so that the weight of the clamp balances the weight of the permanent magnet 23 and the mirror 5 with respect to the axis $A_x$ about which the spring 2 flexes. If the clamp 19 extends sufficiently far, the end of the clamp opposite the spring 2 is grooved so that the leaf spring 1 passes therethrough, such that there is no friction between the clamp 19 and the leaf spring 1.

Figure 19:
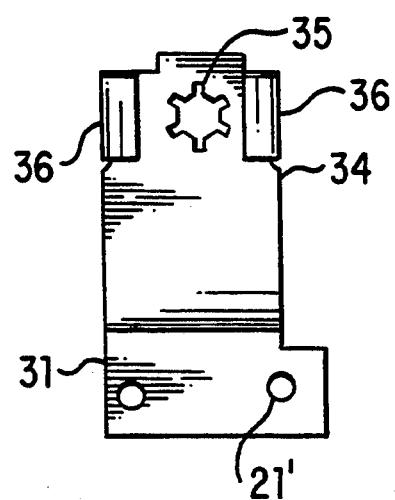
Figure 20:
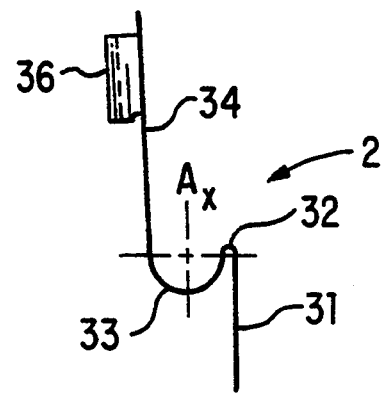

The spring 2 is a metal spring, typically formed of a flat sheet of a beryllium-copper alloy bent into the shape illustrated in the drawings. FIG. 20 provides an edge view of the spring 2. This spring has a first arm 31. As shown in the front view of FIG. 19, openings 21' extend through the first arm 31. The rivets 21, discussed above, pass through the openings 21' to fixedly attach an end of the arm 31 between the bracket extension 18 and the mirror support clamp 19.

An end of a first semi-circular of U-shaped section 32 connects to the second end of the first arm 31. One end of a second semi-circular section 33 connects to the second end of the first semi-circular section The first semi-circular section 32 has a small radius of curvature such that it is relatively rigid. Consequently, the first arm 31 and the first semi-circular section 32 provide a relatively rigid support for the second semi-circular section 33.

A second arm 34 of the spring 2 connects to the other end of the second semi-circular section 33. The second semi-circular section 33 has a substantially larger radius of curvature than does the first semi-circular section 32, such that the second semi-circular section 33 is relatively flexible. Consequently, motion of the mirror 5 in the first direction is produced by flexing of the spring about an axis $A_x$ which is close to or coincides with the central axis of the second semi-circular section 33. Means are provided near the far end of the second arm 34 to support the mirror 5 and the first permanent magnet 23.

In this embodiment, the first permanent magnet 23 is glued or otherwise attached directly to the rear surface of the mirror 5 (FIG. 17). As shown in FIG. 19, the second arm 34 of the spring 2 includes an opening 35 therethrough. A series of spring tabs formed around the periphery of the opening extend radially inward toward the center of the opening 35. The first permanent magnet 23 is cylindrical, and the spring tabs and opening 35 are dimensioned such that the tabs grip the outer surface of the first permanent magnet 23 when that magnet is pressed into the opening. This engagement serves to attach both the first permanent magnet 23 and the scanning mirror 5 to the moveable end of the second arm 34 of spring 2.

Figure 21:
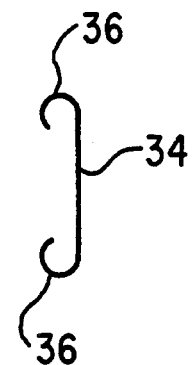
FIGS. 19 to 21 are side, top and end views, respectively, of the spring used to provide X-direction scanning motion in the scanning engine of FIGS. 17 and 18.

As shown in FIG. 21, the arm 34 also has inwardly folded clip-like members or gripping arms 36 formed at opposite side edges of the second arm 34 of the spring 2. FIG. 19 depicts location of the inwardly folded clip-like members arms 36 on either side of the opening 35. The gripping arms 36 clamp the sides of the mirror 5 adjacent the end of the mirror to which the first permanent magnet is attached and thereby provide an additional attachment of the first permanent magnet 23 and the scanning mirror 5 to the moveable end of the second arm 34 of spring 2.

With reference to FIG. 17, this embodiment includes a first electromagnet 25 attached to the upper surface of circuit board 11 at a position in close proximity to the first permanent magnet 23. Also, the first permanent magnet 23 is quite close to the axis $A_y$ about which the leaf springs 1 flex. As a result, stray magnetic fields acting on the first permanent magnet 23 will not produce any substantial moment of force about the axis $A_y$. The axis between the north and south poles of the first permanent magnet 23 lies along the central axis of the cylindrical shape of that magnet and is aligned with or parallel to the axis of the electromagnet 25. Application of a cyclical alternating current signal to the coil of the electromagnet 25 will produce a reciprocating push-pull force on the first permanent magnet 23.

Because the spring 2 attaches near one end of the elongated mirror 5 and the center of mass of the mirror is near the middle of the mirror, the mirror 5 forms a long lever arm with respect to the axis $A_x$ about which the spring 2 flexes. Consequently, forces applied to the magnet 23 will produce a relatively large moment of force on the mirror and will produce a relatively large angular motion thereof. This provides efficient coupling of magnetic forces to the mirror and a large angular displacement of the beam in the X-direction (42.0° shown in FIG. 22).

The bracket 17 also includes an extension 26 for supporting a second permanent magnet. As shown in the side view of FIG. 18, the extension 26 curves around and passes beneath one end of the circuit board 11. The second permanent magnet 27 is attached to the lower end of the extension 26 by suitable means. A second electromagnet 28 is attached to the lower surface of circuit board 11 at a position in close proximity to the first permanent magnet 23. The dimensions of the bracket 17, with its attached extensions 18 and 26, are chosen such that the weights of the various components balance each other with respect to the axis $A_y$ about which the leaf springs 1 flex.

Like the first permanent magnet 23, the second permanent magnet 27 is cylindrical. The axis between the north and south poles of the second permanent magnet 27 lies along the central axis of the cylindrical shape of that magnet and is aligned with or closely parallel to the axis of the second electromagnet 28. Application of a cyclical alternating current signal to the coil of the second electromagnet 28 therefore will produce a reciprocating push-pull force on the second permanent magnet 28.

The above discussed construction of this scanner embodiment permits motion of the mirror in two different directions, and the motion in each direction can be totally independent of the motion in the other direction.

More specifically, when there is no current through the coil of electromagnet 25, the resilient nature of the spring 2 causes the mirror 2 to return to its rest position with respect to the axis $A_x$. When a current is introduced through the coil, interaction between magnetic fields of the coil and the permanent magnet 23 creates a moment of force moving the magnet 23 away from the equilibrium position thereof shown in FIG. 17. This force moment moves the permanent magnet 23 either toward or away from the bobbin and coil of the electromagnet 25. As a result of such motion, a spring force is produced by the spring 2 which tends to bring the permanent magnet 23 back to the rest position. Reversing the polarity of the applied current will reverse the directions of the magnetic force and the opposing spring force. Therefore, if the current applied to the coil of the electromagnet 25 takes the form of a cyclical AC signal, such as a sign wave, a pulse signal, a triangular wave, etc., the induced magnetic forces will produce an oscillatory movement or vibration of the permanent magnet 23 and the mirror 5 attached thereto. Application of such a current, however, will produce no moment of force about the $A_y$ axis, and as a result the motion of the mirror would be entirely horizontal, absent application of a current to the second electromagnet 28. Instead of the alternating current, the drive signal could be a pulse or half wave signal of the same frequency and in phase with the characteristic vibration of the spring 2.

Similarly, when there is no current through the coil of electromagnet 28, the resilient nature of the leaf springs 1 causes the mirror 5 to return to its rest position with respect to the axis $A_y$. When a current is introduced through the coil, interaction between magnetic fields of the coil and the permanent magnet 27 creates a moment of force moving the magnet 23 away from the equilibrium position thereof shown in FIG. 18. This force moment moves the permanent magnet 27 either toward or away from the bobbin and coil of the electromagnet 28. As a result of such motion, spring forces are produced by the leaf springs 1 which tend to bring the permanent magnet 27 back to the rest position. Reversing the polarity of the applied current will reverse the directions of the magnetic force and the opposing spring force. Therefore, if the current applied to the coil of the electromagnet 27 takes the form of a cyclical AC signal, such as a sign wave, a pulse signal, a triangular wave, etc., the induced magnetic forces will produce an oscillatory movement or vibration of the permanent magnet 27. Instead of the alternating signal, the drive current could take the form of a repeating half cycle wave or pulse signal of the same frequency and in phase with the characteristic vibration of the leaf springs 1. Because bracket 17 supports the mirror 5 between the free ends of leaf springs 1 (through extension 18 and spring 2), the vibration of magnet 27 will produce a corresponding vertical movement of the mirror 5. Application of such a current, however, will produce no moment of force about the $A_x$ axis, and as a result, the motion of the mirror 5 would be entirely vertical absent application of a current to the second electromagnet 25.

When both electromagnets 25 and 28 receive cyclical alternating current signals, the resulting oscillating forces on the permanent magnets 23 and 27 produce reciprocal motion of the mirror 5 about both axes $A_x$ and $A_y$. The frequencies of scanning motion about each axis differ slightly in a specific fashion discussed in detail below, such that the beam spot scans a zig-zag pattern across the surface on which the indicia appears and the zig-zag automatically mover across that surface in search of a truncated portion of the indicia which is readable.

Figure 22:
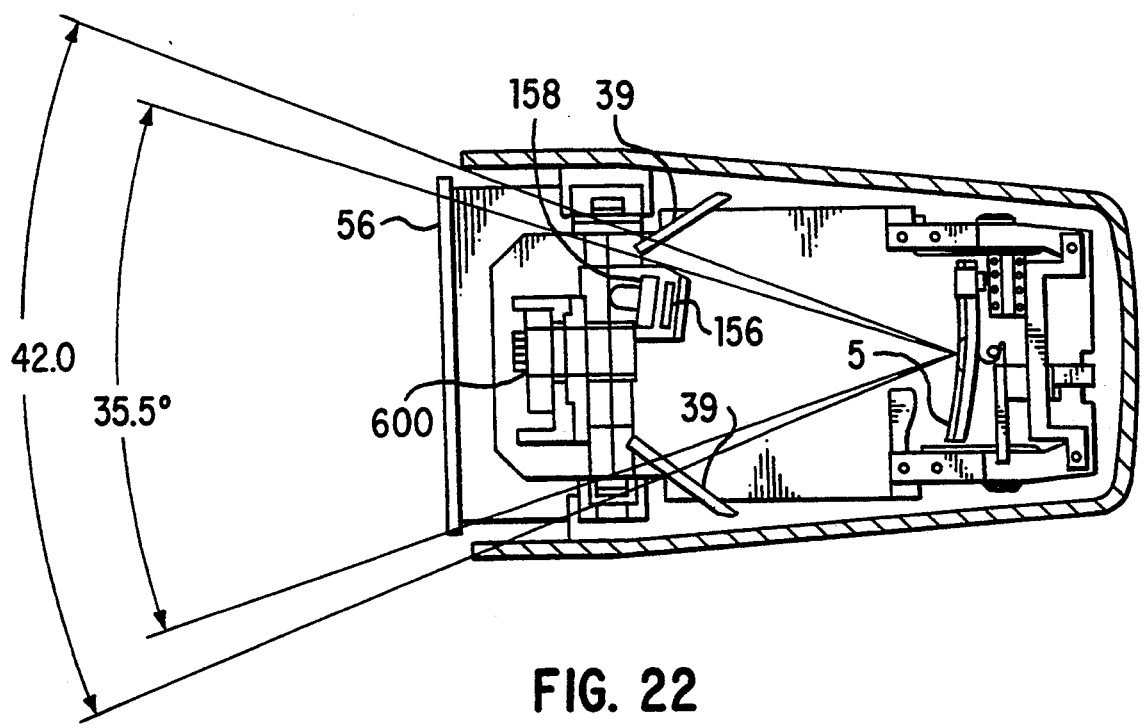
FIGS. 22 and 23 are top and side sectional views, respectively, of a hand held scanner incorporating the circuit board and scanning engine of FIGS. 17 and 18.
Figure 23:
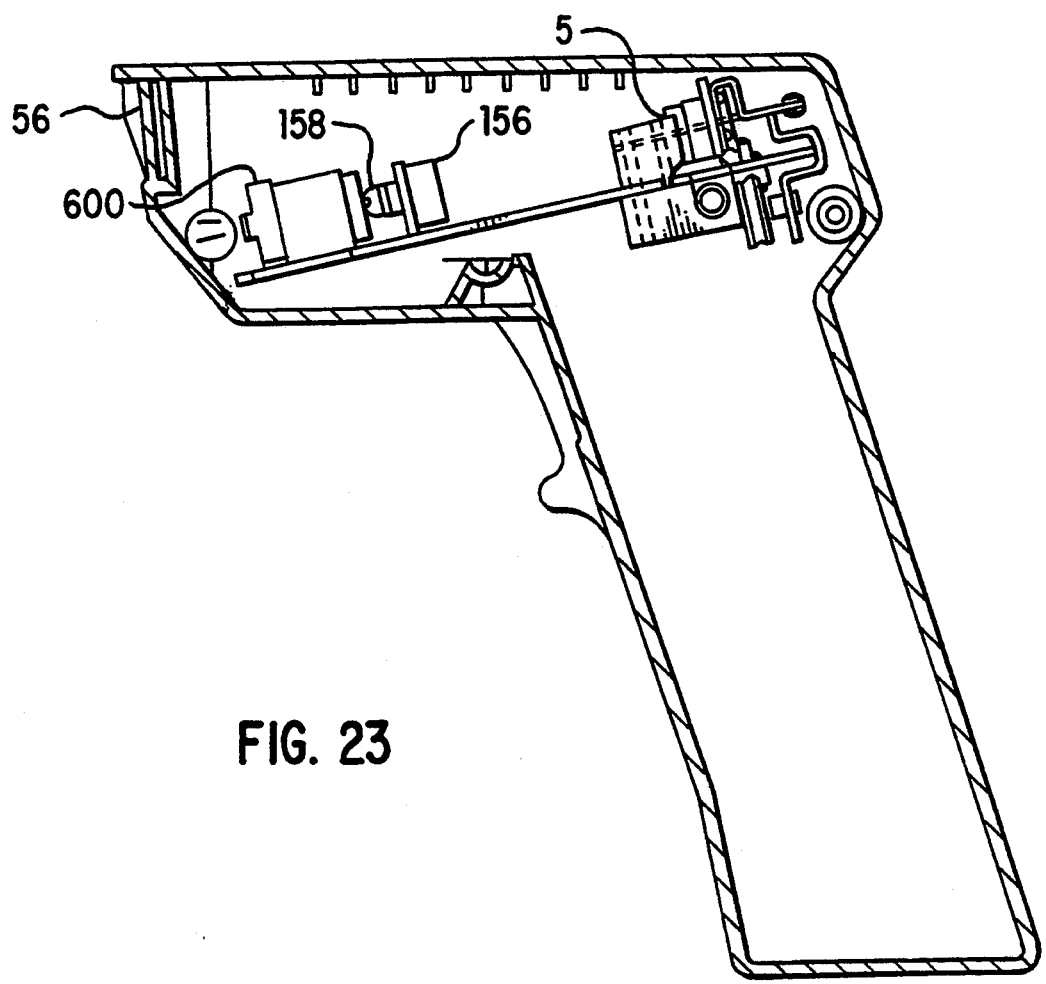

FIGS. 22 and 23 are top and side sectional views, respectively, of a hand held scanner incorporating the circuit board 11 and scanning engine of FIGS. 17 and 18. As depicted in FIG. 22, the laser diode and focusing module 600 produces a light beam which is reflected from the oscillating mirror 5. The mirror 5 oscillates in two orthogonal directions at two different frequencies, as outlined above. This oscillation of the mirror 5 causes the reflected beam 51 to scan back and forth in the X-direction and up and down in the Y-direction in a truncated zig-zag pattern which moves progressively across the surface on which the indicia appears.

As shown in FIG. 22, the scanning engine of the present embodiment will produce a scan angle of 42° in the X-direction. The portions of the scan near the extreme ends of the X-direction motion, where the beam spot stops and reverses direction, include a disproportionately high amount of the laser energy produced during scanning. To reduce hazards to the operator from reflected laser energy and/or hazards to other persons present during scanning, the hand held scanner includes light blocking plates 39 which limit the maximum scan angle of the beam as it emerges from the scanner through window 56. With the plates 39 positioned as shown, the scanning engine of the present embodiment will produce a scan angle of 35.5° degrees in the X-direction.

The light reflected back by the indicia enters the scanner housing through window 56, and the mirror 5 collects and redirects the reflected light toward the detector 158. The redirected light passes through an ambient light blocking filter 156 and impacts on the detector 158. Detector 158 is a photodetector exactly like that used in the embodiments of FIGS. 2 and 3. The detector 158 produces a signal proportional to the intensity of the reflected light. As the scan progresses across the indicia, the detector signal is processed, digitized and decoded in the usual manner (by circuitry not shown) until the decoder detects a valid read.

As discussed above with regard to the embodiment of FIGS. 12–14, oscillation of the mirror in the Y-direction at a quite low frequency compared to the frequency of mirror oscillation in the X-direction causes the beam to implement a raster scan pattern. In the embodiment of FIGS. 17-23, however, a raster pattern is not desired. In this later embodiment, the springs all comprise metal members consisting of the same material, e.g a beryllium-copper alloy, which tends to be relatively stiff. As a result, the spring 2 vibrates at a frequency higher than the vibration frequency of the lead springs, but the difference between the two frequencies is not as great as in a raster scanning type embodiment.

If the two scanning frequencies were equal to each other, the beam would scan a line at an angle to the horizontal and would repeatedly scan back and forth across that line. If the ratio of the two scanning frequencies were 2:1, the beam would implement a zig-zag pattern. Such a pattern, however, would have exactly two horizontal lines per frame and would exactly repeat after each complete Y-direction scan cycle. Any such exact multiple relationship between the scanning frequencies will produce a rapidly repeating pattern wherein the beam spot crosses the exact same portions of the indicia over and over again. Each frame defined by a vertical scan cycle will repeat the pattern of the immediately preceding frame. If the pattern crossed a damage section of code or a poorly printed section having imperfections, the scanner would not be able to read the encoded information no matter how many times such a pattern repeats.

The ratio of the X-direction scanning frequency to the Y-direction scanning frequency therefore should be greater than 1.5 and less than 2.0. In the preferred embodiment, this ratio is approximately 1.75:1. For example, if the X-direction scanning frequency is 60 Hz, and the Y-direction scanning frequency is 35 Hz, the actual ratio between the frequencies is 1.71:1. As a result of such a frequency relationship, the beam spot implements a truncated zig-zag pattern, but the pattern does not repeat after each frame and progresses across the surface on which the indicia appears.

More specifically, the beam spot passes left to right across a horizontal line, then downward right to left along a diagonal line. The beam spot then passes left to right across a second horizontal line, and then upward left to right along a second diagonal line. The beam spot subsequently moves through a repeat of the zig-zag because the high scanning frequency is not an even multiple of the low scanning frequency (ratio 1.75:1), however, the first horizontal line of the next zig-zag will occur at a position slightly below the position of the first horizontal line of the first zig-zag pattern. Thus each frame, defined by a vertical scan cycle, will not repeat the immediately preceding frame.

The pattern produced by scanning in accord with the present embodiment will repeat eventually, but before the pattern repeats, the zig-zag will move progressively from top to bottom across the indicia. As such, the pattern will include a large number of zig-zags, each having two horizontal lines and two diagonals. Many decoders used in bar code scanning systems can decode a valid reading of the indicia for lines passing over the indicia from left to right and from right to left. The diagonals tend to have a relatively small angle with respect to the horizontal. Thus each line of the moving zig-zag pattern can produce a valid reading of the indicia, if the portion of the indicia the line passes over is complete and intact.

In many cases, a badly printed bar code or a scratched or damaged bar code will still include at least some small truncated portion which is sufficiently intact to read the code if the scan lines cross that section in the proper alignment. The progressive movement of the pattern across the indicia results in a search across the indicia for such an intact truncated section of the code. The progressive movement of the scanning pattern also results in a search across a target surface for a small indicia or bar code.

Also, the inclusion of diagonals in the pattern will produce scanning lines at different angles with respect to the bars of the indicia, which further increases the probability of enough scan lines passing over an intact section of the indicia at a proper angle to permit a reading of the encoded information. As a result, the operator need not hold the scanner at so precise an angle with respect to the bars of the indicia in order for the scanner to read the indicia.

We claim:

1. A self-contained optical scanning module for reading optically encoded indicia having portions of differing light reflectivity, said module comprising:
a base;
an emitter, fixedly mounted on said base, for emitting a beam of light;
optical means for directing the beam of light toward the optically encoded indicia;
support means, attached to said base, for mounting the optical means for oscillating movement;
means for producing a reciprocal motion of the optical means on said support means such that the beam of light scans across a surface on which said indicia appears;
detector means for receiving light reflected back from the surface and producing electrical signals corresponding to the differing light reflectivity of the optically encoded indicia;
a first circuit board mounted orthogonal to said base at one end of said base;
first circuit means mounted on said first circuit board;
a second circuit board mounted orthogonal to said first circuit board and parallel to said base;
second circuit means mounted on said second circuit board; and
an electrical cable connecting said first and second circuit means to each other, wherein said first and second circuit means operate together to produce signals to drive the emitter, to produce signals to drive the means for producing a reciprocal motion and to process the electrical signals produced by the detector means.

2. A module as in claim 1, wherein the first circuit means comprises a drive circuit for producing a signal to drive said emitter.

3. A module as in claim 1, wherein the second circuit means comprises an application specific integrated circuit for producing the signals to drive the means for producing a reciprocal motion of the optical means and for processing the electrical signals produced by the detector means.

4. A module as in claim 1, wherein:
the emitter comprises a laser diode, said base is metal and
a portion of said metal base forms a heat sink for dissipating heat generated by the laser diode during operation of the scanning module.

5. A module as in claim 1, wherein the means for producing a reciprocal motion comprises first and second magnets one of which is a permanent magnet and the other of which is an electromagnet to which an alternating drive signal is applied, the first magnet being fixedly coupled to the optical means, and the second magnet being mounted on the second circuit board in a position in close proximity to the first magnet, such that application of an alternating drive signal to the electromagnet produces a magnetic field which acts on the permanent magnet to produce reciprocal movement of the optical means.

6. A module as in claim 1, wherein the detector means comprises a linear array of photodiodes supported orthogonal to both the first circuit board and the second circuit board.

7. A module as in claim 6, wherein the linear array of photodiodes extends along a side surface of said module.

8. A module as in claim 7, further comprising a holder supporting the linear array of photodiodes, said holder being fastened between said metal base and the second circuit board.

9. A module as in claim 8, wherein said holder includes an extension which engages a groove in said base and at least one pin which protrudes through an opening in the second circuit board.

10. A module as in claim 1, further comprising a scanner housing containing all components of said module.

11. A module as in claim 10, wherein the scanner housing is pen shaped and also contains one or more components for writing.

12. A module as in claim 11, wherein the one or more components for writing include electronic stylus means for providing a positional data input to a digitizer tablet upon contact of a tip of the pen shaped housing to a surface of the digitizer tablet.

13. A module as in claim 1, wherein the means for producing a reciprocal motion of the optical means comprises a magnet and a drive means for producing an oscillating force on the magnet, and said support means comprises:

a member having a first end to which said optical means is attached and a second end opposite said first end to which the magnet is attached, the optical means, the member and the magnet being dimensioned such that the weight of said magnet balances the weight of the optical means with respect to an axis approximately half way between the mirror and the magnet;

a flexible planar spring having a free end fixedly coupled to one of the ends of the member, said flexible planar spring being longer than the distance between one end of the member and the axis but shorter than the distance between the ends of the member such that said planar spring flexes about said axis; and means, attached to said base, for fixedly supporting an opposite end of the flexible planar spring.

14. A module as in claim 13, wherein the magnet is a permanent magnet, and the drive means is an electromagnet attached to said second circuit board.

15. A module as in claim 13, wherein the optical means comprises a mirror.

16. A module as in claim 13, wherein the planar spring comprises of a pair of flexible strips.

17. A module as in claim 16, wherein the flexible strips each consist of a sheet formed of a flexible plastic material.

18. A module as in claim 13, wherein the means for fixedly supporting an opposite end of the flexible planar spring comprises:

a pedestal attached to the base, said pedestal having an arm extending parallel to the base; and a plate attached to the arm of the pedestal with the opposite end of the flexible planar spring being clamped between the plate and the arm of the pedestal.

19. A module as in claim 1, wherein the detector means extends along a side module and is substantially orthogonal to said base.

20. An optical scanning system for reading optically encoded indicia having portions of differing light reflectivity, said system comprising:

emitting means for emitting a beam of light, said emitting means including a component for directing the beam of light toward a target surface on which the optically encoded indicia appears;

a member having a first end to which said component is attached and a second end opposite said first end;

a magnet attached to the second end of the member, wherein the component, the member and the magnet are dimensioned such that the weight of said magnet balances the weight of the component with respect to an axis approximately half way between the component and the magnet;

first reciprocal support means for mounting the member for rotational oscillation thereof about the axis;

drive means for producing an oscillating force on the magnet such that the member oscillates about the axis and the component reciprocates through an arc about the axis, thereby causing the beam of light to scan across the target surface;

means for receiving light reflected back from the target surface and producing electrical signals corresponding to the differing light reflectivity of the optically encoded indicia.

21. A system as in claim 20, wherein the first reciprocal support means comprises a flexible planar spring having a fixed end and a moveable end fixedly coupled to one of the ends of the member, said flexible planar spring being longer than the distance between one end of the member and the axis but shorter than the distance between the first and second ends of the member.

22. A system as in claim 21, wherein the planar spring comprises of a pair of flexible strips.

23. A system as in claim 22, wherein the flexible strips each consist of a sheet formed of a flexible plastic material.

24. A system as in claim 21, wherein:

the member is U-shaped and comprises a first arm to which the component is attached, a second arm to which the magnet is attached and a substantially straight section extending between and connecting the first and second arms, said first and second arms being substantially parallel to each other, and the flexible planar spring extends in a direction substantially parallel the substantially straight section of the member when the flexible planar spring is in its rest state.

25. A system as in claim 21, wherein:

the member is straight and extends directly between the magnet and the component, and the flexible planar spring extends in a direction substantially parallel the straight member when the flexible planar spring is in its rest state.

26. A system as in claim 25, wherein:
the drive means comprises a stationary second magnet concentric about but spaced from the straight member at a position intermediate the component and the magnet attached to the second end of the member,
one of the magnets is a permanent magnet, and
one of the magnets is an electromagnet to which an alternating drive signal is applied to produce a magnetic field which acts on the permanent magnet to cause reciprocal movement of the member.

27. A system as in claim 21, wherein:
the drive means comprises a stationary magnet mounted at a fixed position in proximity to the magnet attached to the second end of the member,
one of the magnets is a permanent magnet, and
one of the magnets is an electromagnet to which an alternating drive signal is applied to produce a magnetic field which acts on the permanent magnet to cause reciprocal movement of the member.

28. A system as in claim 21, wherein:
the rotational oscillation of the member about said axis produces reciprocal motion of said component is in a first direction,
said system further comprises reciprocal support means for movably mounting the member so as to produce reciprocal motion of the component in a second direction substantially orthogonal to the first direction such that said beam of light implementers a bi-directional scanning pattern across the surface on which the indicia appears.

29. A system as in claim 28, wherein said drive means produces an oscillating force on the magnet such that the member simultaneously reciprocates in the first direction at a first frequency and the component reciprocates in the second direction at a second frequency different from said first frequency.

30. A system as in claim 29, wherein:
the drive means comprises a stationary magnet mounted at a fixed position in proximity to the magnet attached to the second end of the member,
one of the magnets is a permanent magnet,
one of the magnets is an electromagnet to which an alternating drive signal is applied to produce a magnetic field which acts on the permanent magnet to cause reciprocal movement of the member,
the first reciprocal support means is configured to vibrate at a high range of frequencies and said second reciprocal support means is configured to vibrate at a low range of frequencies, and
the drive signal applied to the electromagnet comprises a superposition of a first signal component having a frequency within said high range of frequencies and a second signal component having a frequency within said low range of frequencies.

31. A system as in claim 28, wherein:
first the reciprocal support means for mounting the member for rotational oscillation thereof about said axis comprises a first flexible planar spring having a first end and a moveable end fixedly coupled to one of the ends of the member, the first flexible planar spring being longer than the distance between one end of the member and the axis but shorter than the distance between the first and second ends of the member; and the second reciprocal support means comprises a second flexible planar spring having a fixed end and a moveable end fixedly coupled to the first end of the first flexible planar spring.

32. A system as in claim 31, wherein each flexible planar spring comprises of a pair of flexible strips.

33. A module as in claim 32, wherein the flexible strips each consist of a sheet formed of a flexible plastic material such as Mylar ™ or Kapton ™.

34. An optical scanning system for reading optically encoded indicia having portions of differing light reflectivity, said system comprising:
emitting means for emitting a beam of light, said emitting means including a component for directing the beam of light toward a target surface on which the optically encoded indicia appears;
a member having a first end to which said component is attached and a second end opposite said first end;
a magnet attached to the second end of the member, wherein the component, the member and the magnet are dimensioned such that the weight of said magnet balances the weight of the component with respect to an axis approximately half way between the component and the magnet;
reciprocal support means for mounting the member for rotational oscillation thereof about the axis;
drive means for producing an oscillating force on the magnet such that the member oscillates about the axis and the component reciprocates through an arc about the axis, thereby causing the beam of light to scan across the target surface;
means for receiving light reflected back from the target surface and producing electrical signals corresponding to the differing light reflectivity of the optically encoded indicia;
wherein (i) the reciprocal support means has a fixed end and a moveable end fixedly coupled to one of the ends of the member, (ii) the member is straight and extends directly between the magnet and the component, and (iii) the reciprocal support means extends in a direction substantially parallel the straight member when the reciprocal support means is in its rest state.

35. A system as in claim 34, wherein the reciprocal support means comprises a flexible planar spring.

36. A system as in claim 35, wherein the flexible planar spring consist of a pair of sheet formed flexible plastic strips.

37. A system as in claim 34, wherein:
the drive means comprises a stationary second magnet concentric about but spaced from the straight member at a position intermediate the component and the magnet attached to the second end of the member,
one of the magnets is a permanent magnet, and
one of the magnets is an electromagnet to which and alternating drive signal is applied to produce a magnetic field which acts on the permanent magnet to cause reciprocal movement of the member.

38. A system as in claim 34, wherein:
the drive means comprises a stationary second magnet mounted at a fixed position in proximity to the magnet attached to the second end of the member,
one of the magnets is a permanent magnet, and
one of the magnets is an electromagnet to which and alternating drive signal is applied to produce a magnetic field which acts on the permanent magnet to cause reciprocal movement of the member.

39. An optical scanning system for reading optically encoded indicia having portions of differing light reflectivity, said system comprising:

- emitting means for emitting a beam of light, said emitting means including a component for directing the beam of light toward a target surface on which the optically encoded indicia appears;
- a member having a first end to which said component is attached and a second end opposite said first end;
- a magnet attached to the second end of the member, wherein the component, the member and the magnet are dimensioned such that the weight of said magnet balances the weight of the component with respect to an axis approximately half way between the component and the magnet;
- reciprocal support means for mounting the member for rotational oscillation thereof about the axis;
- drive means for producing an oscillating force on the magnet such that the member oscillates about the axis and the component reciprocates through an arc about the axis, thereby causing the beam of light to scan across the target surface;
- means for receiving light reflected back from the target surface and producing electrical signals corresponding to the differing light reflectivity of the optically encoded indicia;
- wherein the reciprocal support means consist of a sheet formed of a flexible plastic material.

40. An optical scanning system for reading optically encoded indicia having portions of differing light reflectivity, said system comprising:

- emitting means for emitting a beam of light, said emitting means including a component for directing the beam of light toward a target surface on which the optically encoded indicia appears;
- a member having a first end to which said component is attached and a second end opposite said first end;
- a magnet attached to the second end of the member, wherein the component, the member and the magnet are dimensioned such that the weight of said magnet balances the weight of the component with respect to an axis approximately half way between the component and the magnet;
- reciprocal support means for mounting the member for rotational oscillation thereof about the axis;
- drive means for producing an oscillating force on the magnet such that the member oscillates about the axis and the component reciprocates through an arc about the axis, thereby causing the beam of light to scan across the target surface;
- means for receiving light reflected back from the target surface and producing electrical signals corresponding to the differing light reflectivity of the optically encoded indicia;
- wherein (i) the reciprocal support means comprises a fixed end and a moveable end fixedly coupled to one of the ends of the member, (ii) the member is U-shaped and comprises a first arm to which the component is attached, a second arm to which the magnet is attached and a substantially straight section extending between and connecting the first and second arms, said first and second arms being substantially parallel to each other, and (iii) the reciprocal support means extends in a direction substantially parallel the substantially straight section of the member when the flexible planar spring is its rest state.

41. A system as in claim 40, wherein the reciprocal support means comprises a flexible planar spring.

42. A system as in claim 41, wherein the flexible planar spring consist of a pair of sheet formed flexible plastic strips.

43. A system as in claim 40, wherein:
- the drive means comprises a stationary second magnet concentric about but spaced from the U-shaped,
- one of the magnets is a permanent magnet, and
- one of the magnets is an electromagnet to which drive signal is applied to produce a magnetic field which acts on the permanent magnet to cause reciprocal movement of the member.

44. A system as in claim 40, wherein:
- the drive means comprises a stationary magnet mounted at a fixed position in proximity to the magnet attached to the second arm of the member,
- one of the magnets is a permanent magnet, and
- one of the magnets is an electromagnet to which a drive signal is applied to produce a magnetic field which acts on the permanent magnet to cause reciprocal movement of the member.

* * * * *